United States Patent
Guillama et al.

(10) Patent No.: US 11,372,975 B2
(45) Date of Patent: *Jun. 28, 2022

(54) EVENT DETECTION AND MANAGEMENT SYSTEM

(71) Applicant: The Quantum Group, Inc., Lake Worth, FL (US)

(72) Inventors: Noel J. Guillama, Wellington, FL (US); Chester A. Heath, Boca Raton, FL (US)

(73) Assignees: THE QUANTUM GROUP, INC., Wellington, FL (US); Noel J. Guillama, Wellington, FL (US)

( * ) Notice: Subject to any disclaimer, the term of this patent is extended or adjusted under 35 U.S.C. 154(b) by 32 days.

This patent is subject to a terminal disclaimer.

(21) Appl. No.: 16/724,117

(22) Filed: Dec. 20, 2019

(65) Prior Publication Data

US 2020/0250311 A1  Aug. 6, 2020

Related U.S. Application Data

(63) Continuation of application No. 15/648,185, filed on Jul. 12, 2017, now Pat. No. 10,552,608.

(Continued)

(51) Int. Cl.
*G06F 21/00* (2013.01)
*G06F 21/56* (2013.01)
(Continued)

(52) U.S. Cl.
CPC .......... *G06F 21/565* (2013.01); *G06F 21/316* (2013.01); *G06F 21/564* (2013.01);
(Continued)

(58) Field of Classification Search
CPC .... G06F 21/565; G06F 21/316; G06F 21/564; G06F 21/566; G06F 21/568; G06F 21/6245
See application file for complete search history.

(56) References Cited

U.S. PATENT DOCUMENTS 9,489,516 B1 * 11/2016 Lu ........................... G06F 21/53
2008/0215623 A1 * 9/2008 Ramer ................. G06F 16/9577
(Continued)

*Primary Examiner* — Ghazal B Shehni
(74) *Attorney, Agent, or Firm* — Nixon Peabody LLP

(57) ABSTRACT

Systems and methods for management of data files using a plurality of interconnected operations associated with a plurality of roles are provided. A method involves receiving, from a user terminal, a request to access a portion of the plurality of interconnected operations corresponding to one of the plurality of roles, obtaining a human representation of the portion, and transmitting the human representation to the user terminal for display thereon. The human representation (i.e., an Episodic Social Network representation) is a spatial arrangement one or more affinity groups blocks interconnected via one or more conditional situation blocks, where each of the affinity groups represents a non-exclusive data file classification associated with a set of temporal and non-temporal characteristics and where each of the conditional situation blocks defines a set of conditions for transferring the data file from one of the affinity groups to another of the affinity groups.

20 Claims, 17 Drawing Sheets

Related U.S. Application Data

(60) Provisional application No. 62/361,326, filed on Jul. 12, 2016.

(51) Int. Cl.
*G06F 21/31* (2013.01)
*G06F 21/62* (2013.01)

(52) U.S. Cl.
CPC .......... *G06F 21/566* (2013.01); *G06F 21/568* (2013.01); *G06F 21/6245* (2013.01)

(56) References Cited

U.S. PATENT DOCUMENTS

2011/0283357 A1* 11/2011 Pandrangi ............ H04L 63/1416
726/22
2014/0237545 A1* 8/2014 Mylavarapu ........ H04L 63/1433
726/3
2014/0351154 A1 11/2014 Guillama

* cited by examiner

EVENT DETECTION AND MANAGEMENT SYSTEM

CROSS-REFERENCE TO RELATED APPLICATIONS

This application is a continuation of U.S. application Ser. No. 15/648,185, filed Jul. 12, 2017, now allowed, which claims priority to and the benefit of U.S. Provisional Patent Application No. 62/361,326, filed Jul. 12, 2016, each of which is hereby incorporated by reference herein in its entirety.

FIELD OF THE INVENTION

The present invention is related to event detection and management, and in particular detection and management of events in complex dynamic and variable systems, such as systems for detection and management of malware and systems for management and processing of an electronic healthcare records.

BACKGROUND

In the field of malware detection and removal, processes are often too complex to be managed by humans in real-time. As a result, malware detection and removal is typically an automated process performed via a computer. Yet, these automated processes must be understandable by humans, in order to control actions performed by the computer.

Malware detection and remove processes typically require the selection and application of remedial routines that are conditional on detection of classes of malware. There are often multiple simultaneous infections, some of which may restore each other if removed individually. Accordingly, malware removal can be a multifaceted process in some instances. However, solutions requiring multifaceted processes are not limited to the field of malware detection. For example, in the field of healthcare, the provisioning of services and management of records is also a multifaceted process as it involves incorporating processes and operations associated with a large number of parties.

As a result, there is a need for a high speed unified dynamic machine intelligence that can efficiently and effectively analyze complex interactions in a system or environment and determine how to coordinate efforts and allocate resources to address any issues in the system or environment, such as in the case of a malware-infected computer. Moreover, there is a need to make such systems easily comprehendible by humans and to provide a means for humans to easily interact and adjust the operations and processes in such systems.

SUMMARY

In a first embodiment, there is provided a method of management of a system for managing data files using a plurality of interconnected operations associated with a plurality of roles. The method includes receiving, from a user terminal, a request to access a portion of the plurality of interconnected operations corresponding to one of the plurality of roles, obtaining a human representation of the portion. and transmitting the human representation to the user terminal for display thereon. In the method, the human representation is a spatial arrangement one or more affinity groups blocks interconnected via one or more conditional situation blocks, where each of the affinity groups represents a non-exclusive data file classification associated with a set of temporal and non-temporal characteristics, and where each of the conditional situation blocks defines a set of conditions for transferring the data file from one of the affinity groups to another of the affinity groups.

In some implementation of the first embodiment, the method can also include receiving, from the user terminal, an updated version of the human representation, identifying changes in the human representation, and integrating the changes into the plurality of interconnected operations. The integrating can include determining other ones of the plurality of roles associated with the interconnected operations, and transmitting an update notification to one or more user terminals associated with the other ones of the plurality of roles.

In some implementation of the first embodiment, the obtaining includes identifying computer-executable code in the system associated with the portion and converting the computer-executable code to a human representation.

The system can include a plurality of networked computing devices, each of the plurality of networked computing devices associated with at least one of the plurality of roles and can also include least one hub system interconnecting the plurality of networked computing devices. Thus, in some implementations, the receiving, obtaining, and transmitting is performed via operations of the at least one hub system. The method also includes performing monitoring and coordinating the plurality of interconnected operations at the plurality of networked computing devices via the at least one hub system. The hub system can monitor and coordinate the plurality of network devices via a model representing the plurality of interconnected operations as a collection of affinity group blocks interconnected by one or more conditional situation blocks.

In some implementations, the plurality of operations include operations for checking a data file for malicious software.

In a second embodiment, there is provided a system for managing data files using a plurality of interconnected operations associated with a plurality of roles, the system includes a processor and a computer-readable medium having stored thereon a computer program with instructions for causing the processor to carry out operations. The operations include receiving, from a user terminal, a request to access a portion of the plurality of interconnected operations corresponding to one of the plurality of roles, obtaining a human representation of the portion, and transmitting the human representation to the user terminal for display thereon. In the system, the human representation is a spatial arrangement one or more affinity groups blocks interconnected via one or more conditional situation blocks, where each of the affinity groups represents a non-exclusive data file classification associated with a set of temporal and non-temporal characteristics, and where each of the conditional situation blocks defines a set of conditions for transferring the data file from one of the affinity groups to another of the affinity groups.

In the system, the operations can also include receiving, from the user terminal, an updated version of the human representation, identifying changes in the human representation; and integrating the changes into the plurality of interconnected operations. The integrating can also include determining other ones of the plurality of roles associated with the interconnected operations and transmitting an update notification to one or more user terminals associated with the other ones of the plurality of roles.

In the system, wherein the obtaining can include identifying computer-executable code in the system associated with the portion and converting the computer-executable code to a human representation.

The system can include a plurality of networked computing devices communicatively coupled to the processor, each of the plurality of networked computing devices associated with at least one of the plurality of roles. Thus, the operations can further include monitoring and coordinating the plurality of interconnected operations. The operations can also include storing a model representing the plurality of interconnected operations as a collection of affinity group blocks interconnected by one or more conditional situation blocks and monitoring and coordinating the plurality of interconnected operations using the model.

In a third embodiment, there is provided a method of management of a system for managing data files using a plurality of interconnected operations associated with a plurality of roles. The method includes receiving, from a user terminal, a request to access a portion of the plurality of interconnected operations corresponding to one of first validation operations in a pre-operating system (PreOS) environment and second validation operations in an operating system (OS) environment. The method also includes obtaining a human representation of the portion and transmitting the human representation to the user terminal for display thereon, where the human representation comprises a spatial arrangement one or more affinity groups blocks interconnected via one or more conditional situation blocks, where each of the affinity groups represents a non-exclusive data file classification associated with a set of temporal and non-temporal characteristics regarding a validation status, and where each of the conditional situation blocks defines a set of validation conditions for transferring the data file from one of the affinity groups to another of the affinity groups.

In the method of the third embodiment, the first set of validation operations includes at least a signature analysis and the second set of validation operations includes at least a behavior analysis.

The method can also include receiving, from the user terminal, an updated version of the human representation, identifying changes in the human representation, and integrating the changes into the plurality of interconnected operations.

BRIEF DESCRIPTION OF THE DRAWINGS

There are shown in these drawings the embodiments which are presently preferred. It is expressly noted however that the invention is not limited to the precise arrangements, scenarios, and instrumentalities shown.

DETAILED DESCRIPTION

Figure 1:
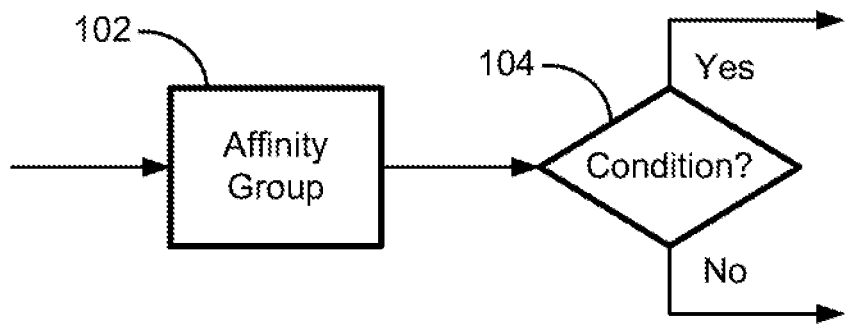
FIG. 1 is an example Episodic Social Network (ESN) depicting the concept that experience is a series of social groups that are often conditionally joined to form the sequence of occurrences that form reality. Because the conditional decision points can be potentially predicted, the outcome of a seemingly random series of group memberships can be envisioned.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The present invention is related to computer malware detection and management, human behavior, predictive analytics in resources management, interaction between humans and machines social media, decision management, logistics, medical personnel management, medical equipment allocation, triage and military logistics, and all complex dynamic and variable management scenarios similar to malware medical management and resources As noted above, one of the difficulties with implementing malware management and removal processes is that such processes are multifaceted. As such, this requires not only identification of infections currently present in a computer system, but also an understanding of how such infections interact with the elements of the computer system in order to determine the most effective course of action to eliminate the infection in the computer system.

The various embodiments are directed to methodologies, and systems therefrom, that address the aforementioned issues by leveraging Episodic Social Network (ESN) theory. In particular, the affinity groups formed by the applications and infections operating on a computer system can be used to view and predict the propagation of infections and interactions thereof. Affinity groups under ESN theory are group of elements or components that share temporal and non-temporal characteristics, as described in U.S. Patent Application Publication No. US2014/0351154A1, the contents of which are herein incorporated by reference in their entirety. Thus, based on changes in the temporal and/or non-temporal characteristics, the operation of applications and infections running on a computer system can be modeled as a conditional network.

Each affinity group may then be remediated by independent processes that can specialize in each infection. In situations of multiple simultaneous infections, the conditional network permits defined progress from one stage of recovery to another. This concept does not define a specific therapy against malware—rather a means to manage multiple strategies against multiple infections under a single management envelope. Indeed, this technique enables efficient upgrade and addition of strategies as well as a record of tracking the progress and techniques to remove malware.

Although the various embodiments will be described primarily with respect to malware detection and removal processes, the various embodiments are not limited in this regard. Rather, this same approach can be used to address other scenarios where remedial action is required, but where complexity and urgency strain the performance and responsiveness of human capabilities.

For example, some medical treatment situations require an ever increasing complexity for medical response. Consequently, many medical treatment situations require efficient and effective coordination of medical systems, services, and personnel in a short timeframe. Further, non-medical systems, services, and personnel may also need to be coordinated for such situations, such as payer organizations, diagnostic services, emergency medical transport, nursing services, and government organizations.

Previously such coordination was easily handled by a single individual, often the primary medical care provider. However, with the increasing number of systems, services, and personnel to consider, such manual coordination is difficult, if not impossible. To some degree, automation of medical records, decision support systems, practice and case management systems, and hospital facility management systems relieve some of this burden, but they can also demand information not available to the provider or provide conflicting or incorrect information. Further, in some scenarios, additional non-medical parameters may need to be considered. For example, in a combat zone, there may be additional concerns with the security of care facilities, availability and locations of specialized medical personnel or services, rapid decision support of unique wound pathology, and competing needs on the battlefield.

However, this type of decision-making is not straightforward, even in a computer. In particular, because treatment choices, whether in a computer system or on the battlefield, are conditional and based on a wide variety of factors, it would be useful to provide some means to model events and outcomes and use such modeling to effect treatment. Further, it would be useful for such modeling to be relatively simple, thus allowing humans to understand the model and thus more easily understand treatment decisions made by the computer, as well as more easily determine where changes and improvement are needed. As described in detail below, leveraging ESN theory addresses these issues.

ESN theory is based on the concept that social networking is not one continuous stream of events, but rather a series of episodes that may occur for an individual, or individuals, joined into an affinity group of common interest (i.e., having a set of common temporal and non-temporal characteristics). Thus membership in any affinity group may be lasting or ephemeral. These episodes are joined by conditional situations that may stimulate abandoning or transitioning from one affinity group for another. This is schematically illustrated in FIG. 1, wherein an affinity group 102 is connected to other affinity groups (not shown) via a conditional situation 104. The series of episodes may occur consecutively or in parallel and the number of conditional situations can vary. As a result, the series of episodes and related conditional situations can define complex conditional networks.

Figure 2:
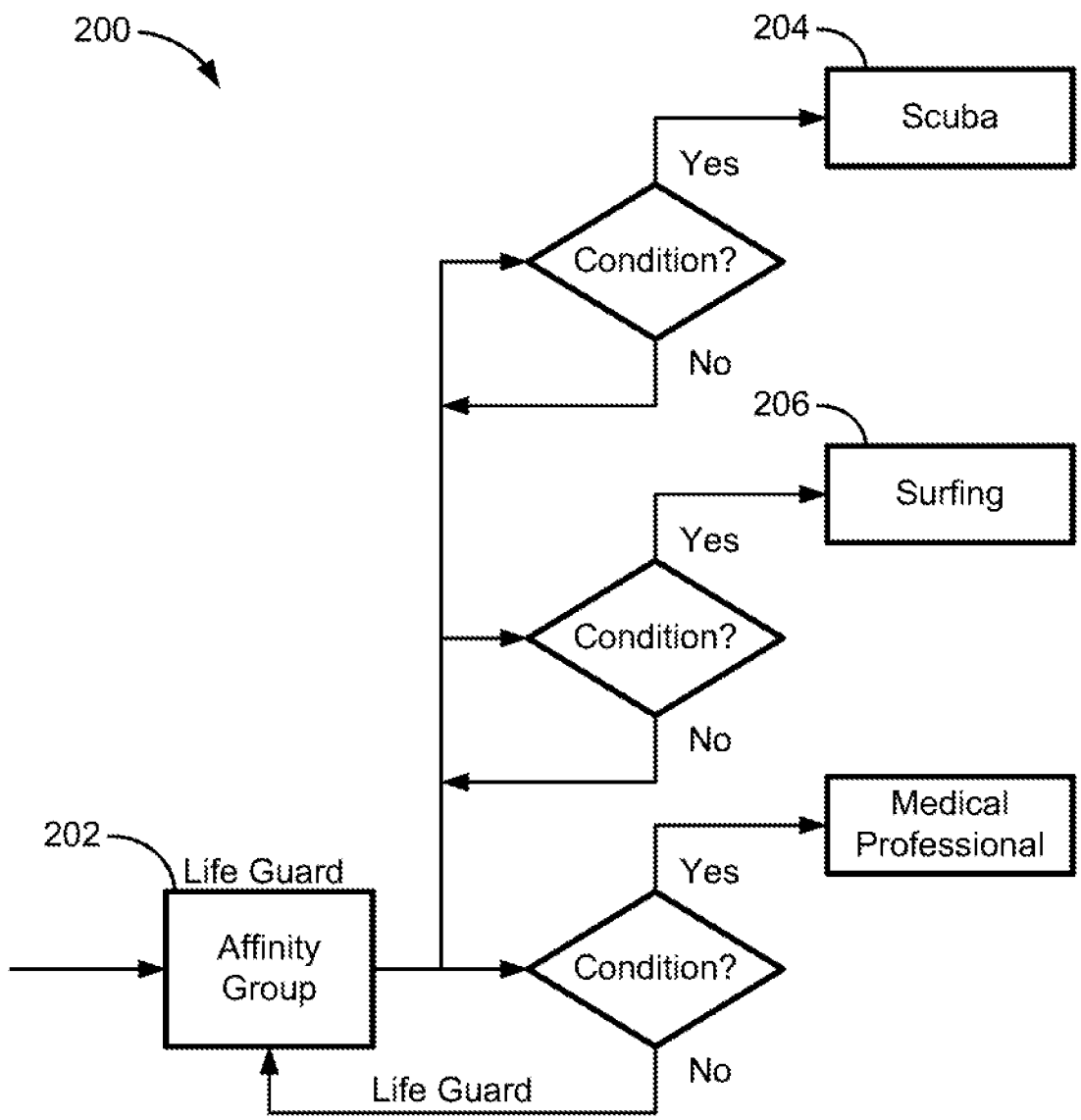
FIG. 2 shows the concept of an affinity group with a conditional junction potentially to other affinity groups. This element is the "neuron", or basic building block of ESNs.

For example a person employed as a lifeguard might be centrally focused on that career and interested in nothing that deters from that path, save competitive "Ironguard" events in that field. They might try surfing or scuba diving for a short time while maintaining the lifeguard occupation, yet eventually tire of wave or undersea exploration. This is schematically illustrated by the ESN 200 in FIG. 2. In the figure, along with the lifeguard group 202 the scuba and surfing groups are additional affinity groups 204, 206 that the person joins, but the decision could have been between the two activities as the person might only afford one. Further, if these activities do not lead to permanent choices or lasting paths, they can be removed in order to simplify a diagram.

ESN theory recognizes that possibly inconsequential events cause pivotal changes in purpose and direction and that nothing is continuous. Rather, the life of a human, a system, or a computer program can be described as a series of conditionally connected episodes. The advantage of ESNs is that groups of individuals or processes, or data that have affinity, are relational, can be processed simultaneously. This avoids the iterative processing that is typically more consumptive of resources and processing in the computer. Further, the affinity group remains associated, and further parsing of the data should require fewer operations. Indeed, one of the strategies of recent malware is to have multiple instantiations of the infection and thereby overwhelm the defenses of the system. It is envisioned that ESNs can be applied to many disparate fields, including healthcare, where the efficiencies in operation would result in faster operation.

Figure 3:
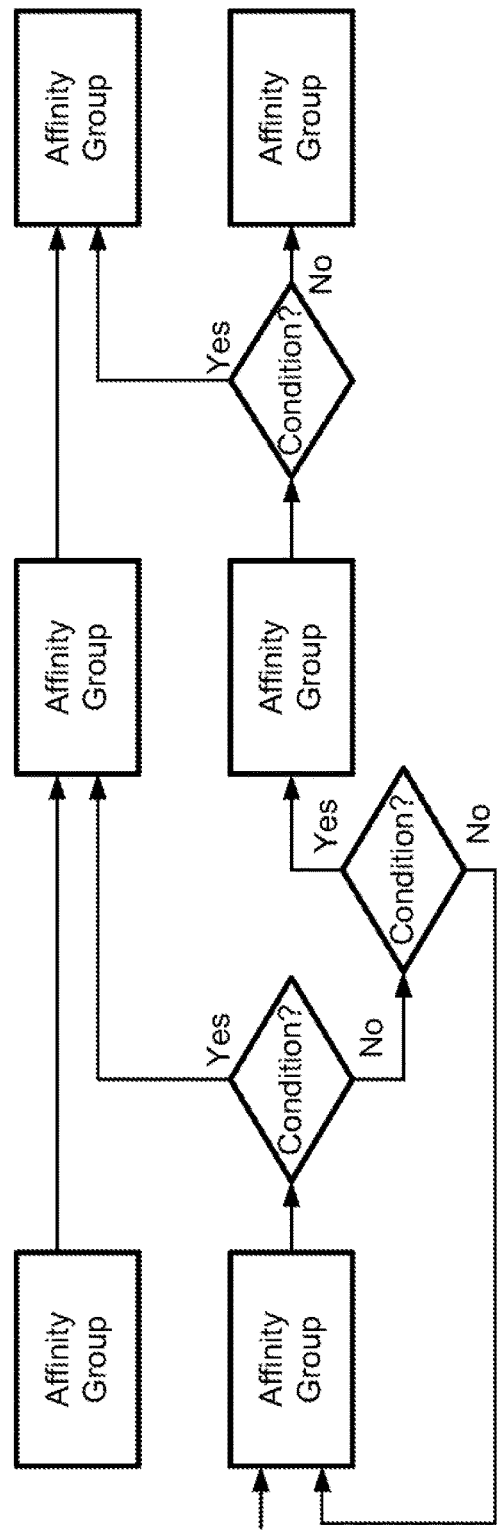
FIG. 3 shows a network of ESN neurons interconnected to define a process.

FIG. 3 shows a simplified diagram that illustrates only the lasting paths that describe a complex joining of conditional affinity groups. The diagram shows that there are multiple paths to a final affinity group, that complex decisions can be assembled from simple decision blocks and that a decision may lead to feedback to an earlier point. These conditionally joined affinity groups define an ESN and may be real and personal, as in the previous examples, or abstract as in a family of states inside a computer process. They may be micro, as in a simple computer process, or macro, as in a general systems approach.

Computer Malware Detection and Removal Using ESN Concepts.

Typical approaches to virus and/or malware removal are signature recognition, heuristic analysis in a sandbox, heuristic—behavioral analysis in the full system environment and only allowing a white list of accepted software to execute.

Many anti-malware processes scan for malware using a database of known malware signatures, which are snippets of the executable code that are still large enough to be unique to a given piece of malware. These definitions do not necessarily tell what the malware does, only how to identify it. An executable file is parsed for matches to the signature and if the alleged snipped is found in the file, the file is considered to be infected. The snippets of code are supplied by regular updates to a local database of signatures, provided by a service that is constantly analyzing newly introduced viruses.

Overall, If the anti-malware program detects a file that matches the definition, the file is flagged as potential malware. This is a good way to remove known threats, but it does require regular updates to make sure the program doesn't miss out on newly developed malware. So called "zero-day" infected files that arrive at the user's system before an update is provided, can still attack the system.

Signature analysis alone is therefore not enough to offer complete protection. Further some infections can disable connectivity to update services, install multiple redundant "instantiations" (copies of themselves) that defy singular detection and even self-replicate to disguise their signature. However, signature analysis is suitable for a first example of a process that can outlined by ESN concepts. This is illustrated in FIG. 4

Figure 4:
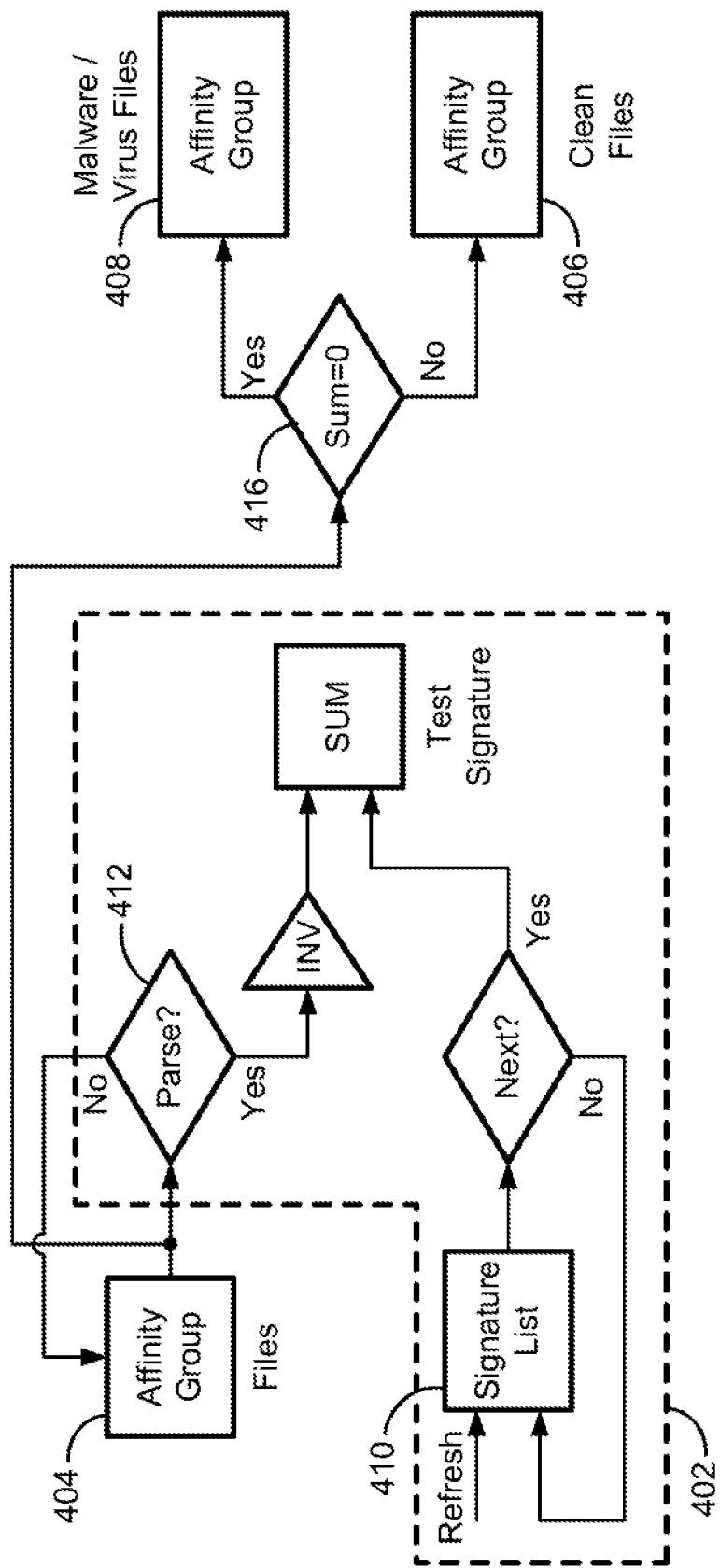
FIG. 4 shows a virus/malware signature test ESN example.

As shown in FIG. 4, unexamined "suspect" files are members of an affinity group 404, as are examined files that pass signature analysis 406, and those that fail analysis 408. Signature analysis is performed continuously by a test process 402 so that one or more sum values indicating the presence (Sum=0) or absence (Sum=1) of a signature in a suspect file are stored for each file. In test process 402, a signature list 410 is provided, which can be reset or updated as needed. To test for signature, a file in affinity group 404 is selected and processed until is it completed parsed into sections (412). The section are then inverted (412) and summed (414) with each of the signatures stored at 410. The sum values are then stored for the files. It should be noted that a sum need not be exactly 0. Rather equivalence or near equivalence (1>>Sum>0) is a sufficient condition for assigning a sum value of) to a section of a file. Thereafter, the file can move to one of affinity groups 406 or 406 depending on the sum (via conditional situation 416). This is one example of many analytic processes that can be applied to suspect files by a larger management process.

Figure 5:
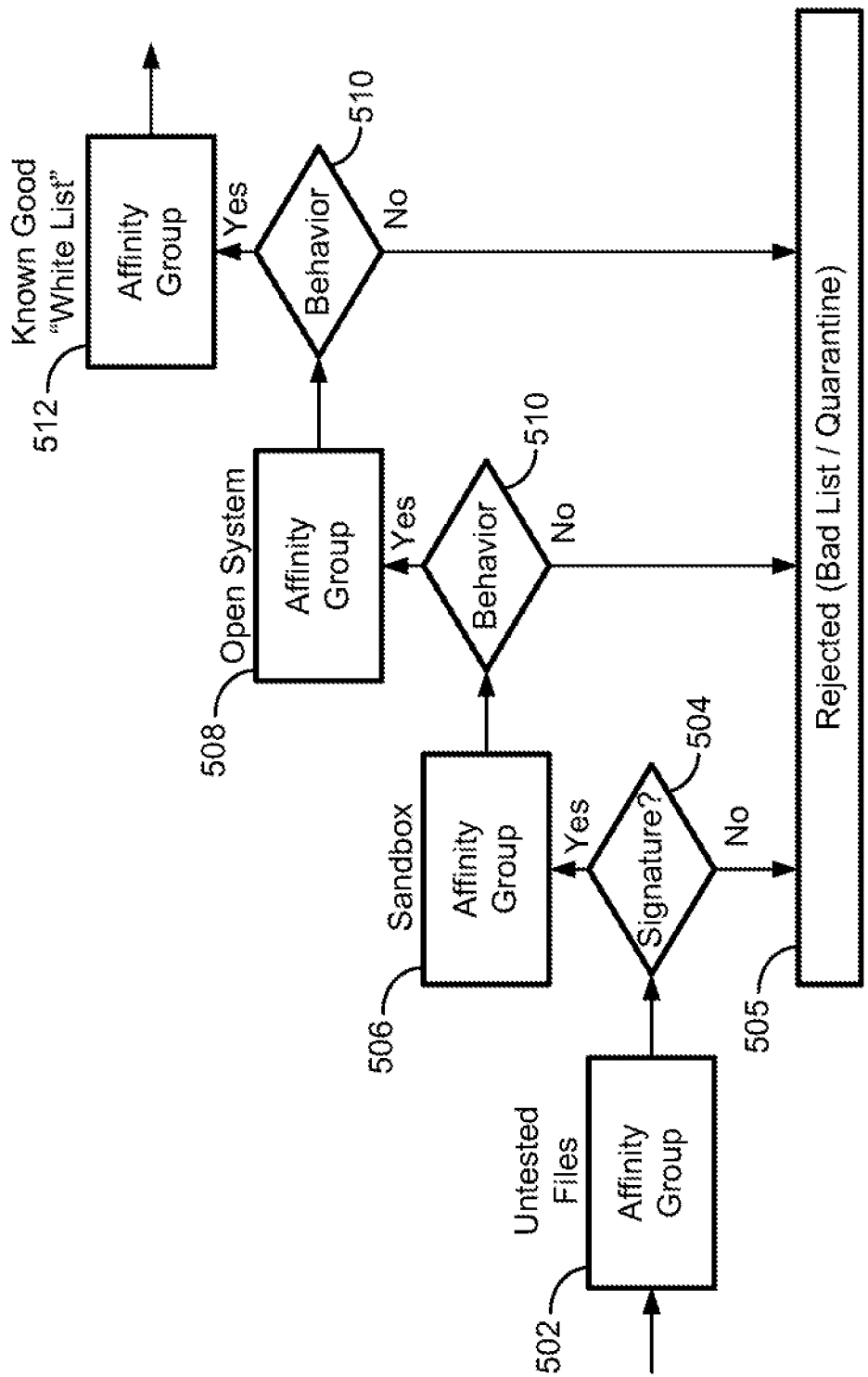
FIG. 5 shows a sequential anti-malware process ESN example.

FIG. 5 defines a more elaborate process that adds subsequent steps to signature analysis for trapping suspect behaviors, such as disabling connectivity, accessing operating system and registry files, attempting to write to protected portions of the disk drive, and the like. Untested files 502 are first run through a signature test 504. If a malware signature is detected ("N" at 504), the file is rejected as bad and quarantined (506). If a signature is not detected ("Y" at 504), behavioral tests are run in a protected area of the system 506, called a sandbox, and later run in the full system 508, as some malware can detect a sandbox environment. At each of 506 and 508, if the behavioral test indicates malware ("N" at 510), the file is rejected as bad and quarantined (506), Else ("Y" at 510), the file passes to the next process. Note that each process 506 and 508 is depicted as an affinity group, conditionally connected to the next. Eventually, a "white list" of known clean files is assembled as an affinity group 512 as well. Further the successful process for removal of each virus is maintained, such that the system may learn, heuristically, the optimal plan of attack for any given infection. Where multiple instantiations of a common virus infect a machine, the optimal sequence of steps to remove each one from various components of the operating system and applications can be catalogued for future optimization of removal.

Figure 6:
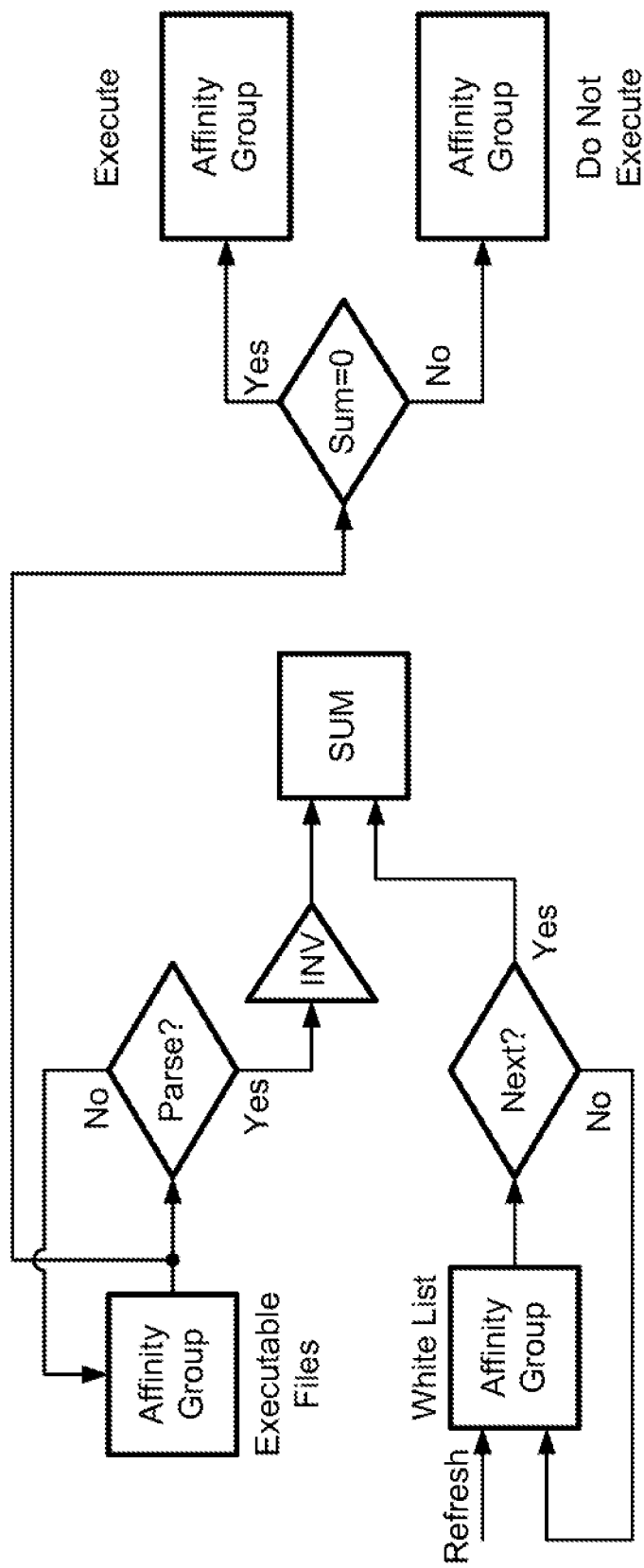
FIG. 6 shows a white list execution enablement test ESN example.

FIG. 6 shows another process step, structurally similar to the signature analysis of FIG. 4, where files to be executed are initially compared to the "white list" before execution. Note that a system could be designed where the white list is assembled simultaneously as files graduate the earlier affinity groups. Indeed, these steps could be completed on demand, while completion of a full while list is completed in background. This may not be as sluggish as it may first appear, as initially a small number of files are required to start the system.

Figure 7:
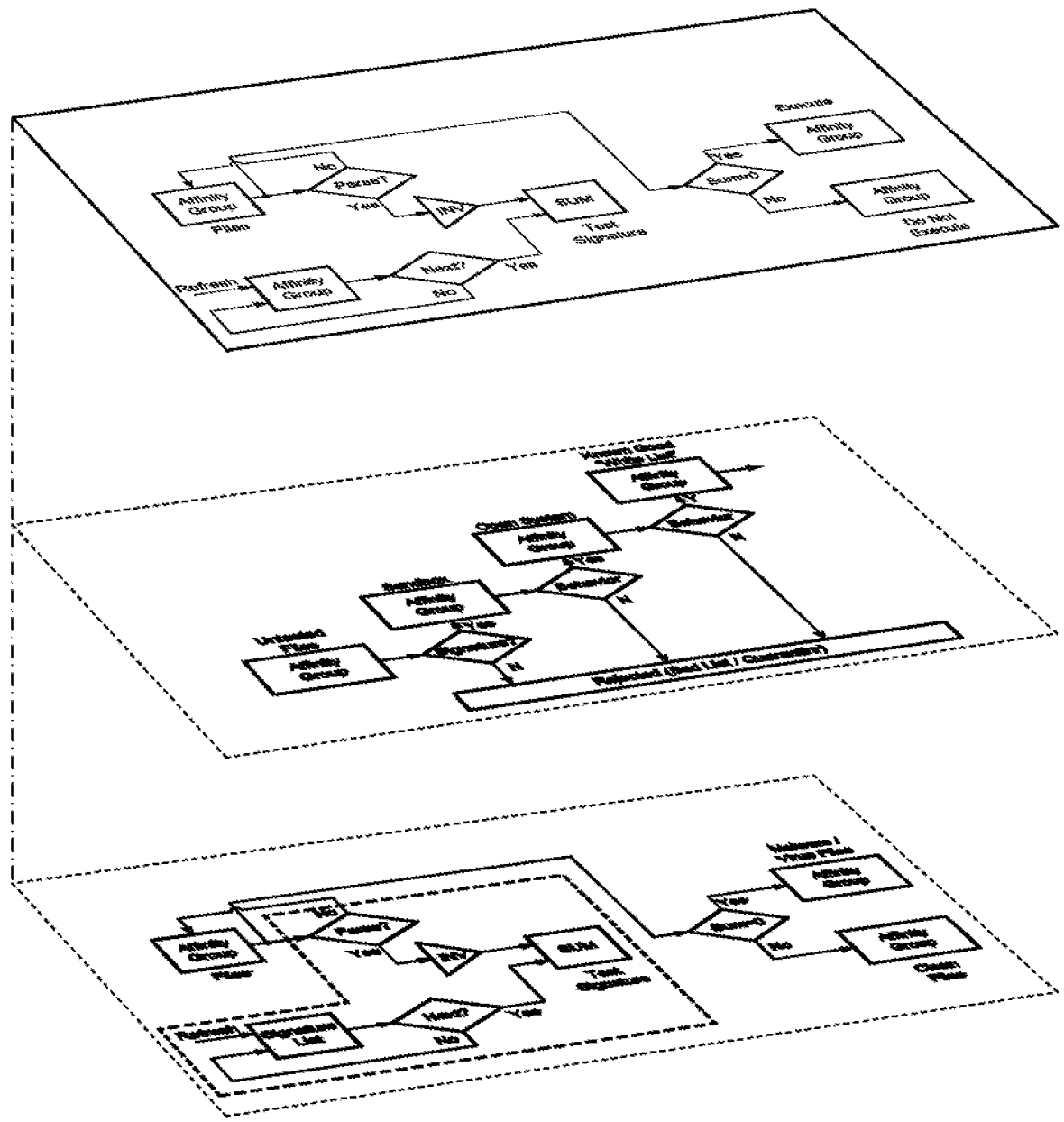
FIG. 7 shows simultaneous ESN perspectives.
Figure 8:
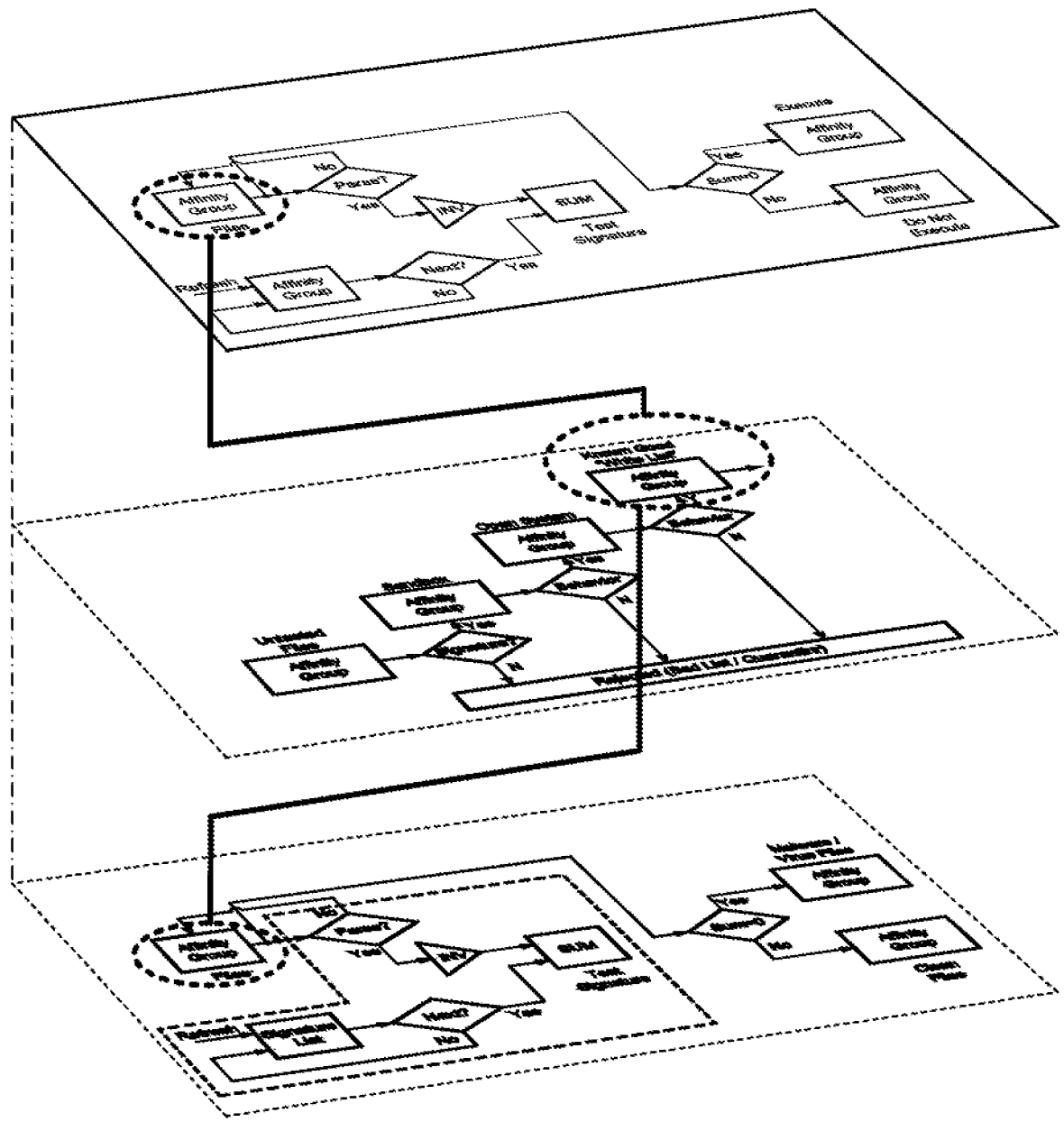
FIG. 8 shows simultaneous file presence in multiple processes.

FIG. 7 shows these processes (processes of FIGS. 4, 5, and 6) as concurrent or contemporaneous operations or processes. As used herein, "concurrent" or "contemporaneous" operations or processes refer to operations that occur simultaneously or during a same period of time. FIG. 8 shows that from a given file's perspective, it may be in multiple affinity groups simultaneously. If a system is to manage the progress of executable files, this perspective would be essential to scheduling the availability of files and dependent operations.

Figure 9A:
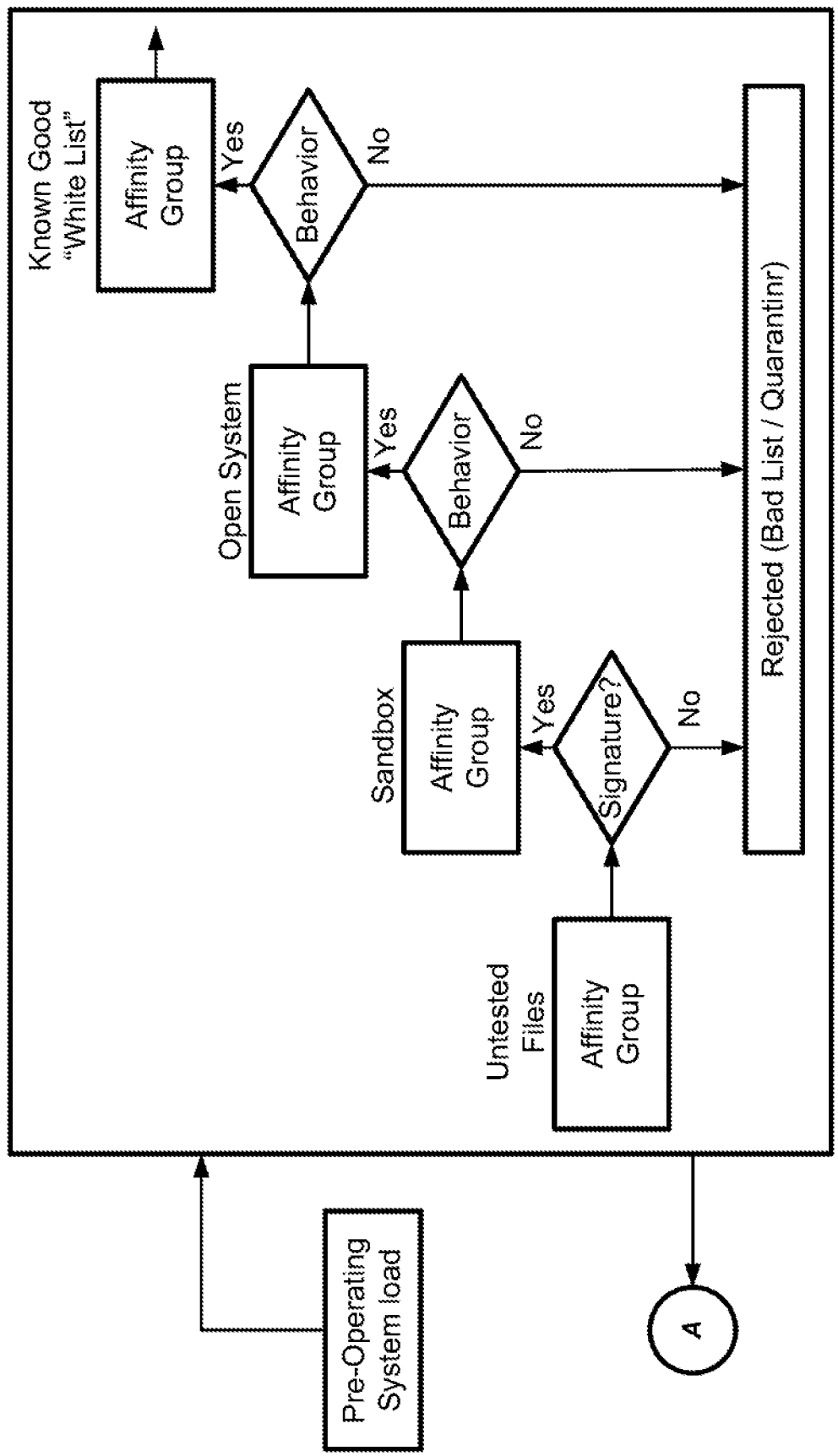
FIGS. 9A and 9B show a two-stage file validation environment with offline mode.
Figure 9B:
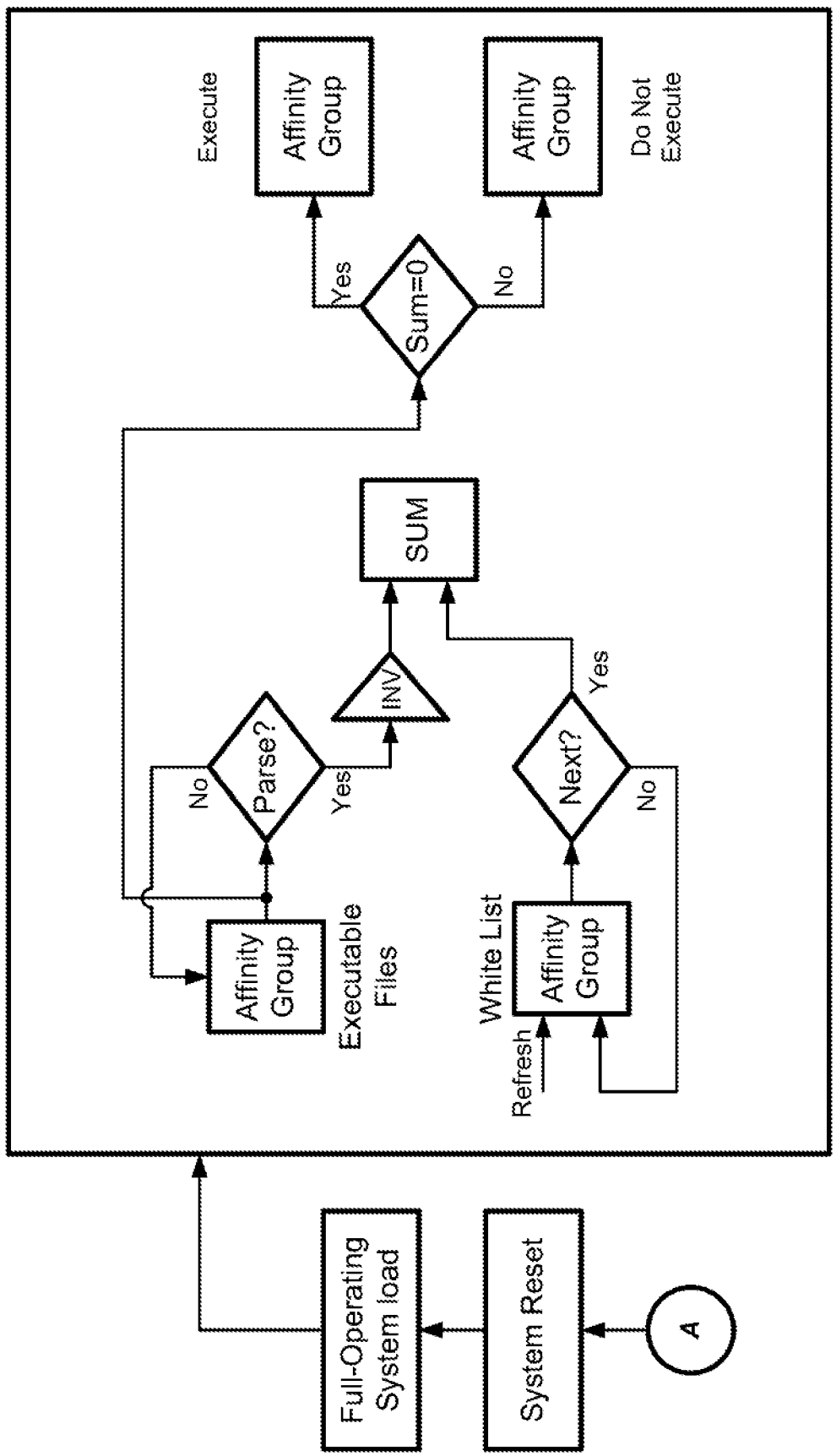

Alternately, a "pre-operating system" (PreOS) environment might complete a complete set of white list file validation operations under a unique operating environment that has minimal functionality and loads for the specific purpose of file validation. This is illustrated in FIGS. 9A and 9B. For example, as shown in FIG. 9A, the PreOS could carry out the methodology described above with respect to FIG. 5. In such embodiments, this PreOS can be of a different and more simplistic foundation than the actual operating system, such as Linux, or the like, with minimal device support (connectivity and storage devices at minimum) and run in an offline manner. As shown in FIG. 9B, initialization of a full system environment, such as Windows, causes the PreOS to terminate and execute a systems reset before the system's normal operating system environment loads and begins to execute the (then) known good files.

Healthcare Management

As noted above, the methodologies described herein are not only applicable to management of malware and other malicious software, but also to management of any other type of complex scenario. For example, in some embodiments, the methodologies described above can also be applied to management of healthcare.

Figure 10:
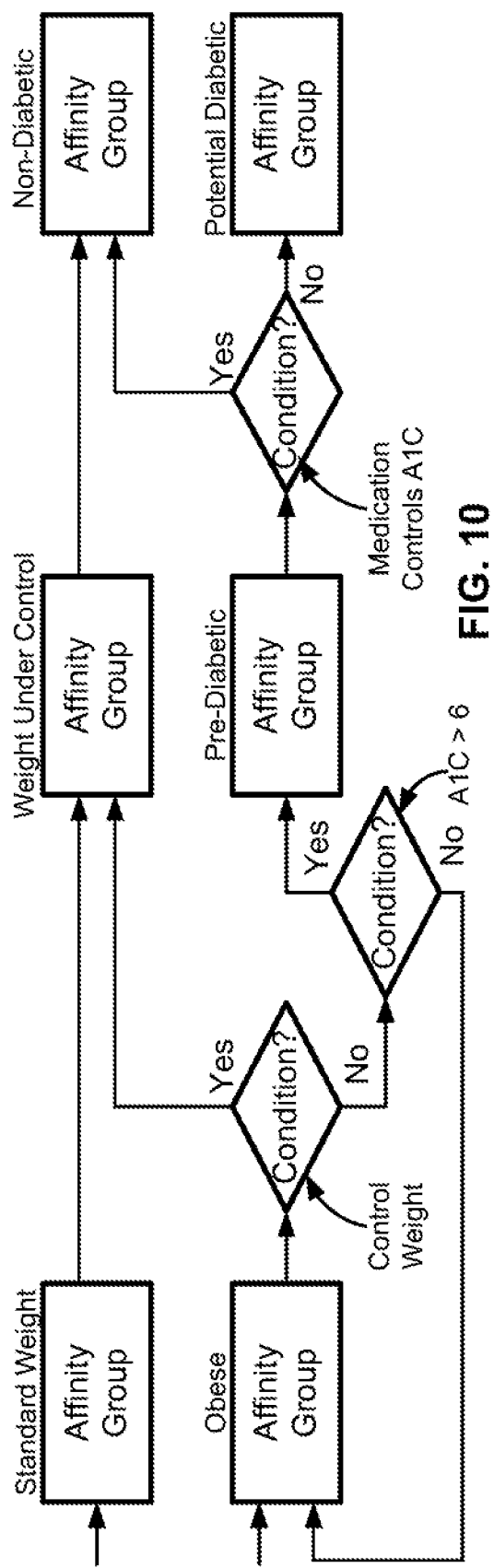
FIG. 10 shows an example network for disease observation and management for a specific malady.

The following example will show how an individual may move through a healthcare scenario in a realistic situation. Consider a path for a progressive disease that uses the ESN taxonomy to describe the progress from first symptoms to potential expression of Diabetes in a population. This is illustrated in FIG. 10. It is presumed that most people in the population would remain on the upper track (move to "weight under control") and avoid diabetes and that obese individuals in the population would migrate to symptoms of potential diabetes (move to "pre-diabetic" and on to "potential diabetic"). Although this figure illustrates what is observed in the population, this figure also effectively illustrates a care plan to potentially move the majority of individuals to the non-diabetic affinity group by controlling weight and through medication. More than just a flow chart, each affinity group is a stage in the progression or elimination of the disease. As a generalized care plan, it is the decision process that a care provider might follow in treating persons in the population.

Given that therapies, treatments, and care plans are often limited to (FDA) approved processes, ESNs again provide advantage with the simultaneous "Macro" processing of all members of an affinity group. Further, medicine is an art as well as a science or technology. Many decisions in the rules of transitions between affinity groups are not rote logic and involve the emotion and judgment of skilled humans that are not easily depicted or recorded by machines. The rules of transition and organization of the ESN are a way to represent the impact of the art within the machine that would be difficult to achieve otherwise.

For example a care provider sees a linkage of patient responses that arise from communication within the group about the severity or expression of a symptom. Within the ESN, the provider adds new rules of expression that query patients about the nature of the symptom (in an unbiased) way and the computer system may augment this with statistical analysis depicting the significance of the responses. ESNs are thereby providing enhanced man-machine synergy and make it easier for one provider, or a team of providers, to follow the art of another.

Figure 11:
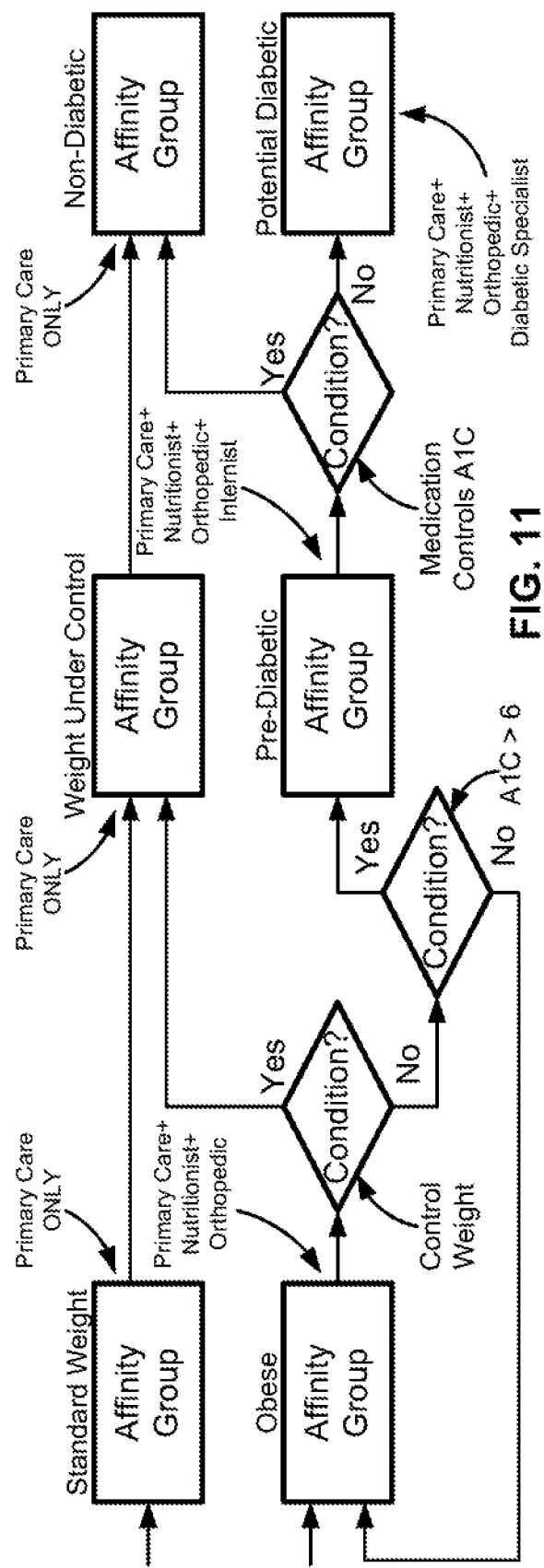
FIG. 11 shows the assignment of specific care providers to the disease management process.
Figure 12:
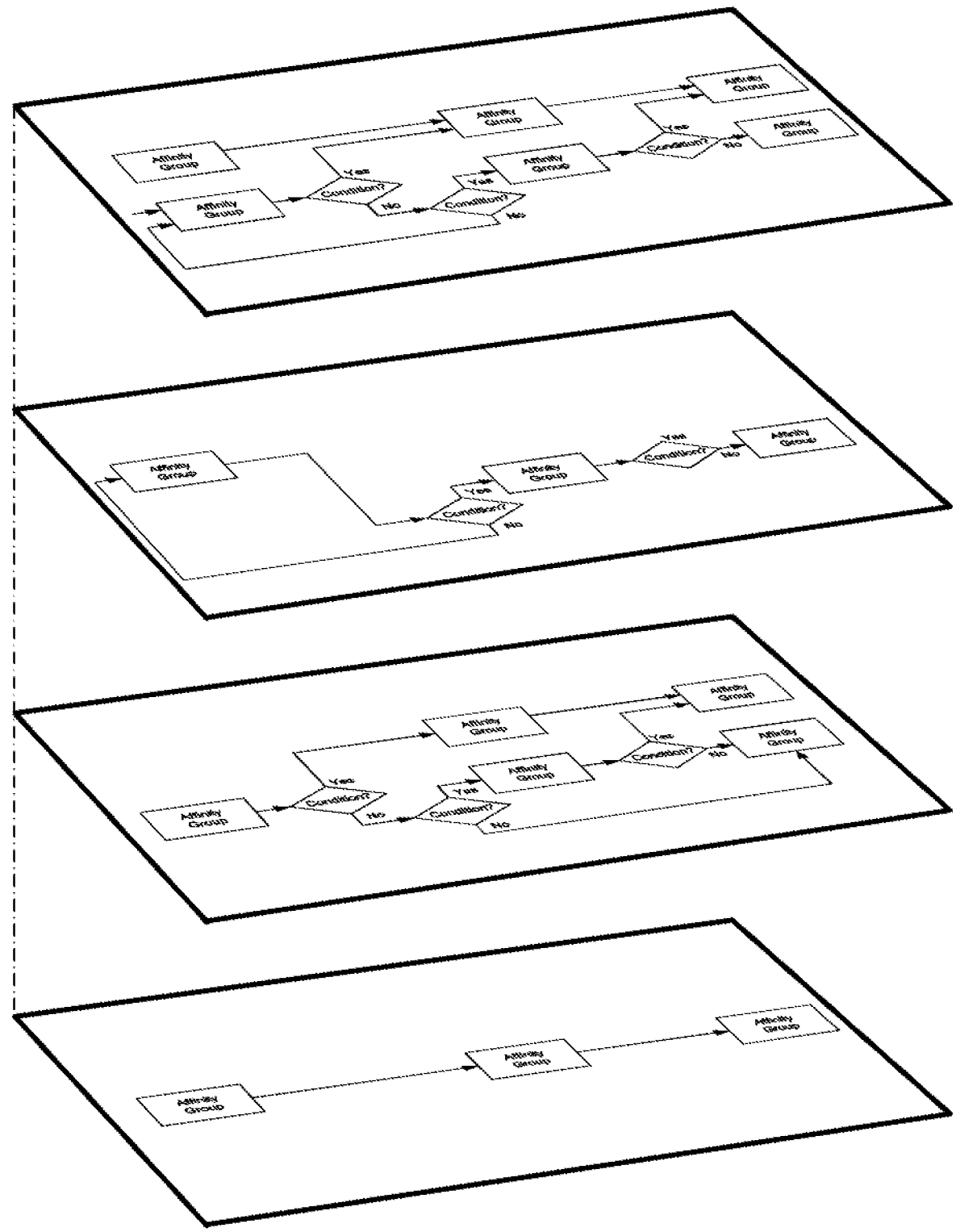
FIG. 12 shows that from the perspective of the care providers, they are assigned over separate processes—each of which can be envisioned as a care plan plane in a 3 dimensional space.

However, things become more complex when a team incorporates specialists in specific stages of a disease, as shown in FIG. 11. Here each affinity group from FIG. 10 may have a different team. A nutritionist may join the primary care and perhaps an orthopedic specialist if weight stresses joints. If the individual progresses to the pre-diabetic group, an internist may join the team. With more specialists, the burden of management increases. One advantage of the ESN approach is that each specialist will see different responsibilities and consequently they have in effect a separate ESN path. This is illustrated in FIG. 12. Each layer in FIG. 12 is the progress through a care plan as seen primarily by the patient. They are members of affinity groups who are receiving "Like" treatment—often in an (FDA) approved process. Each stage employs specific skills. It is the perspective from which all of the roles in FIG. 13 evolve. That is, the paths overlay to provide a 3 dimensional representation of the entire task to management that can be stored in a computer and associated with a particular patient, set of patients or disease.

Figure 13:
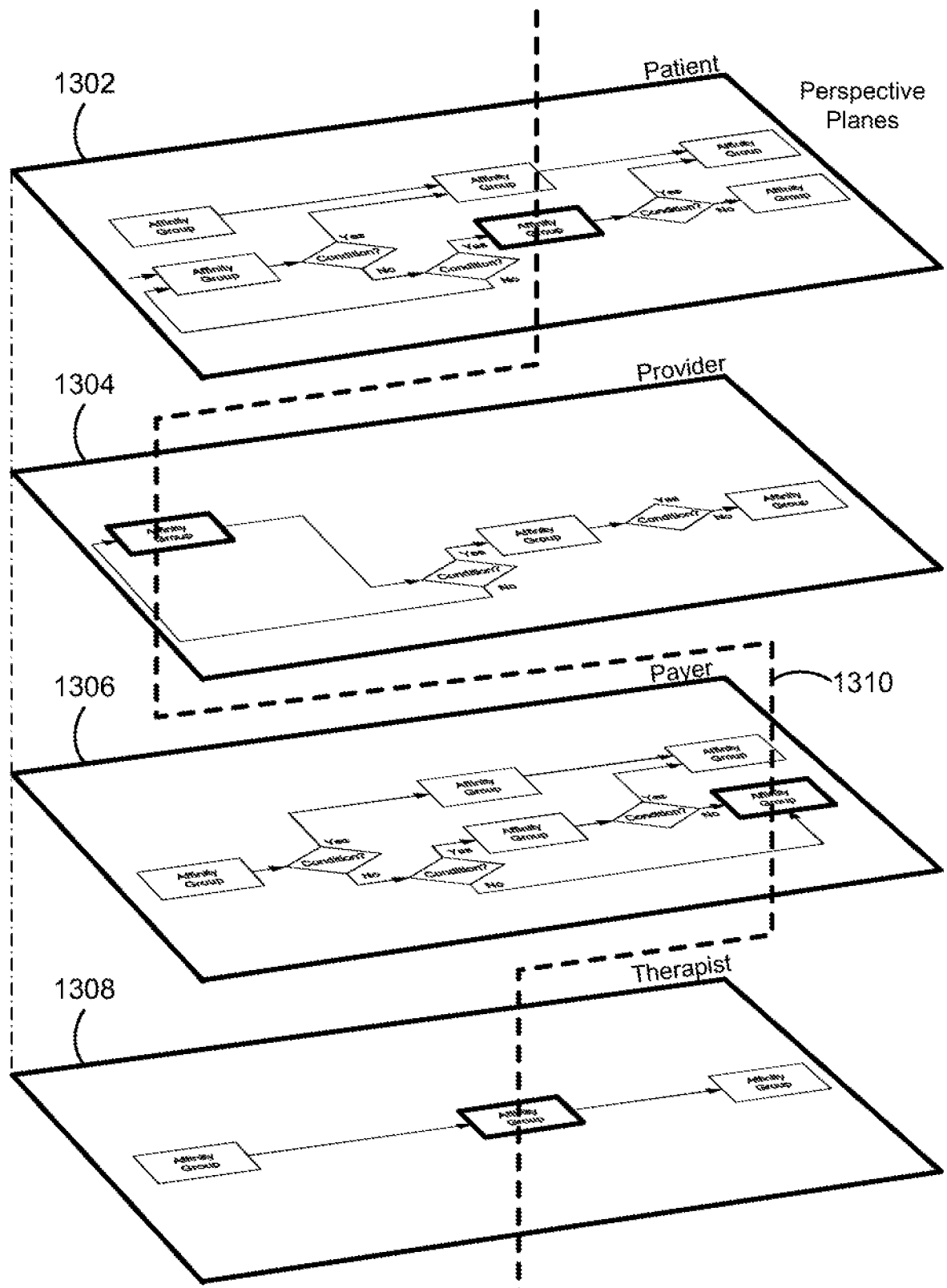
FIG. 13 shows that an affinity group for given individual may occur at specific points of a care plan for each care provider. Further this information can be reduced to a 3 dimensional matrix for the purpose of management by a computer program.

Indeed, there are often roles, unseen by a patient, some not therapeutic that are just as enabling to care and recovery. These might be the payer and the patient themselves, or billing services, procurement of medications, allocation of durable medical equipment and scheduling of advanced diagnostic equipment, such as an MRI machine. Each has a role that can be described as a perspective plane in a complex presentation of the team effort. Imagine the complexity of the effort to treat a cancer, with infusion, radiation, surgery, reconstruction and other roles in a hospital. Perception of the whole could be daunting without a means to divide the roles and present them along with their individual interactions with the patient. For example, as shown in FIG. 13, the roles can be expressed via different ESNs. For example, although the entirety of care for a patient may be expressed by a complex ESN (1302), a provider, a payer, or a therapist may have a different perspective due to their limited role. These also can be expressed as separate ESNs (1304, 1306, 1308). Further, as shown by the dotted line (1310), a particular patient will be in different affinity groups for each of the layers.

Now add the non-therapeutic roles. This taxes the limits of a human's ability to perceive the entire system. Breaking down the roles and coordinating them in a computer makes the process(es) manageable. This could be especially valuable where an optimal path to treatment is time sensitive—as in a virulent cancer or other highly infectious disease. Costs can be maintained by scheduling MRI diagnostics on off-peak hours, with the computer assuring that results will be available to the rest of the team with appropriate responsiveness. In this way, the time to a cure, the cost of the complex interplay of skills and the availability of skills, resources, and critical materials can be maintained efficiently.

Figure 14:
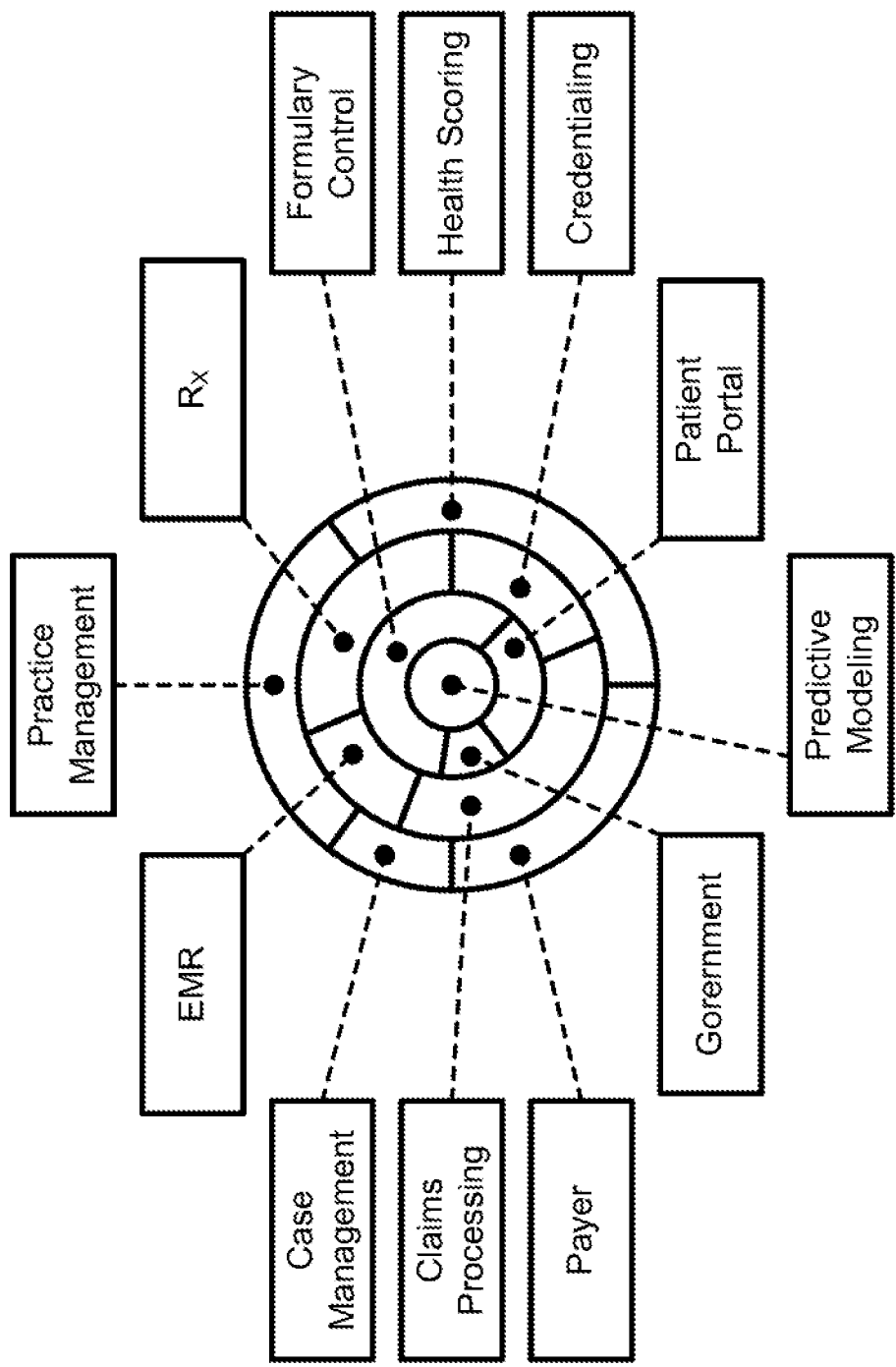
FIG. 14 shows that a number of planes for each perspective may be defined—each of which becomes a matrix dimension within the computer. Here the multiple planes are depicted in a 3-D space for clarity. In reality, these planes are each components in a plurality of services and management that comprise a universal perspective of the patient experience for a given patients medical treatment protocol.

By extending these concepts to the management of a hospital, ESN-based care plans become a means to present a complex situation to management and show how such a situation can be managed. Further they are a means, where step by step, the care process is recorded, so as to allow heuristic accumulation of the optimal care plans. The patient's record follows at each step of the healthcare process, including therapies, application of medical resources and equipment as well as specific care givers. This is a detailed record of the process, where optimization at the treatment level becomes possible, rather than grossly between care givers or institutions. For example, FIG. 14 shows an example of various layers to be considered, each which be expressed as an ESN. Further consider an emergency situation. An automobile accident requires air-transport of the patient for the earliest possible surgery. The computer can balance the time it takes for specific surgical skills to arrive to an operating room at a selection of hospitals. One may have the right skills nearby, but be further in airtime from the accident. Another may have the correct diagnostic, or surgical equipment on hand, still another may have a supply of a rare blood type. The computer can balance the complex interplay of these variables to get the patient out of surgery and into recovery in the optimum time. Further—all these resources can be allocated more cost effectively and in the most time efficient manner with the computer balancing the universe of variables This management mechanism is adaptable to other complex scenarios. For example: a box lunch service provides meals to air travelers making connections at a local airport, to interstate busses at scheduled stops, and to local business executives. Meals are provided by custom order from multiple local restaurants and the available menu is subset of all the restaurant cuisine selections available. Orders come in by cell phone and Internet with a guaranteed response time and at a guaranteed time for delivery to meet the connections—even if the flight or bus is late.

Figure 15:
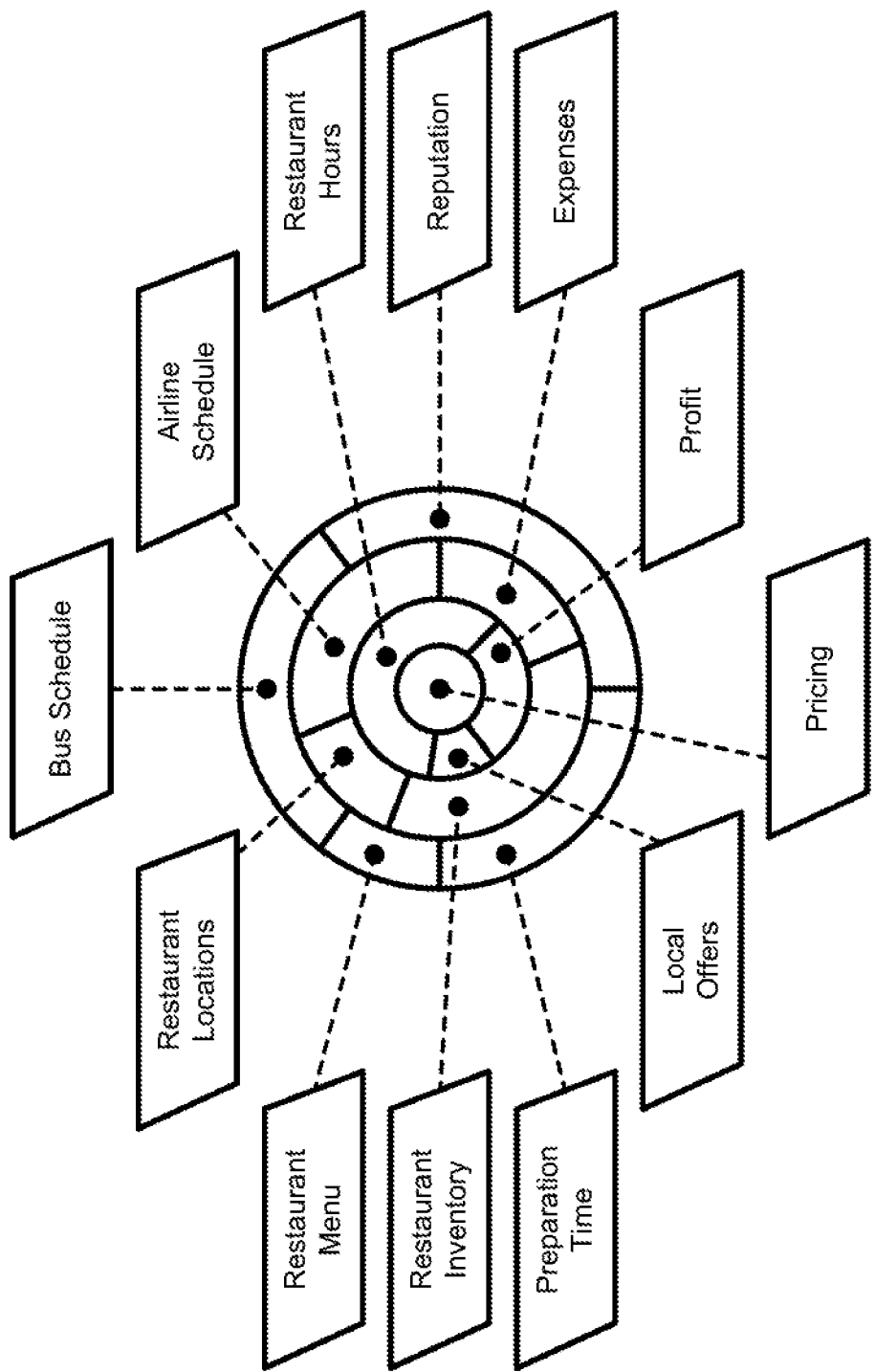
FIG. 15 shows an example assignment of a typical set of services for a universal medical management system.

There is a logistics problem in collecting all the ordered meals for all the restaurants with minimum travel time and within the schedule and arriving at the requested point of delivery within the scheduled time. Further, an order has to be rejected if a selected restaurant does not have the materials on hand to assemble the meal. It is therefore in the interest of the box lunch service to offer perpetual inventory management of menu creating materials for its subscribing restaurants, in order to provide as many meals as possible. The complexity of this problem is illustrated in FIG. 15, which shows the various factors that need to be considered.

To solve this problem, affinity groups are (sometimes even continuously) created of available restaurants that are open, that have the inventory, that have the pricing within customer range. Only this menu is presented on line or via cell messaging. Affinity groups are created from the air flight orders, bus orders, and local orders. A logistics program sorts the orders and creates a pickup route. Tentative credit card orders are processed and completed by pickup. Potentially, ESNs reflecting the availability of ingredients, chefs, and operational hours of the restaurants could be created, or selected from a library as required.

Instead of independent entities or providers operating in their own specialties, lacking a clear picture of the importance of the total care of the patient's wellness, the ESN model provides the "connected-ness" or the automated oversight that is lacking, particularly in the care of a complex medical situation as in the management of multiple pharmaceuticals for a patient in distress.

The strength of the ESN representation is not in the processes used by it, but the fact that the ESN process can be used to model any complex system. Moreover, the ESN representation can be considered a human representation—a representation easily comprehendible by human beings. Thus, in some embodiments, the ESN or human representation can be used to diagrammatically show a user how any portion of the complex system works, whether it is a malware processing system, a medical management system, or any other system. This representation can be adjust or edited and fed back into the system to cause modification thereof.

Figure 16:
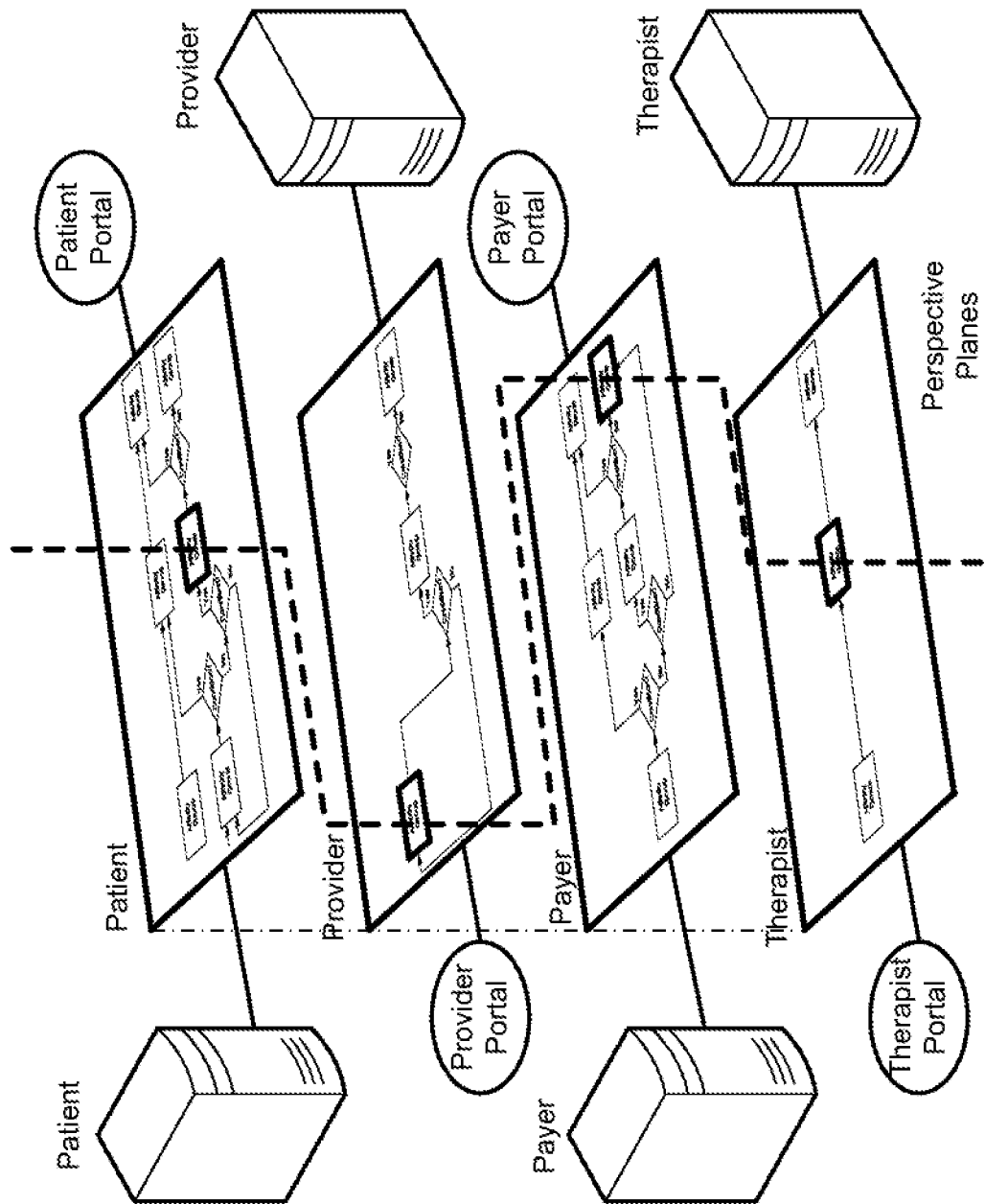
FIG. 16 shows an exemplary system according to the various embodiments.

For example, referring to FIG. 16, there is shown a cloud-computing based system for managing healthcare. In the example of FIG. 16, there are role systems for each of the roles (Patient, Provider, Therapist, Payer, etc.) that are interconnected via the cloud. The roles systems may be resident in each of the participant's physical facilities for security reasons, or co-resident in a secure hosting facility. In some embodiments, the role systems can simply feed data to a system in the cloud and the operations for managing healthcare can all be performed there. In other embodiments, the operations associated with a particular role can be performed at the individual role systems and data can be interchanged between the role systems through one or more hub systems located in the cloud. In general, the operations associated with each role are related to standard procedures for dealing with certain medical conditions, test, incidents, or processing financial information regarding the same.

In addition to the foregoing, portals can be provided for each of the roles (Patient, Provider, Therapist, Payer, etc.). In this way, users associated with the roles can access the hub system and review the operations associated with their roles. In particular, embodiments, this can involve the hub system delivering to them a representation of operations associated with their role using an ESN representation. Thereafter, user can adjust the ESN representation as needed and resubmit to the system, where any changes are incorporated back into the operations of the system. In some implementations, such a submission can involve generating a notification that causes users with other roles to be notified of the changes. In turn, they can review ESN representations of the operations associated with their roles and make changes, as needed.

As noted above, the operations initially incorporated into the system may be standard operations. However, as time goes one, the use of an ESN representation allows the user to define additional affinity groups and conditional situations to account for non-standard events and thus fine-tune general processing protocol for a role. For example, a physician can adjust standard medical parameters or recognize that a new affinity group may be formed requiring different treatment. In turn, these changes can be made know to other user associated with different roles, in which case they can adjust operations for their roles appropriately. In some cases, such a process may occur automatically, as the operations can be configured allow for additional affinity groups and conditional situations arising in operations for another role.

Figure 17:
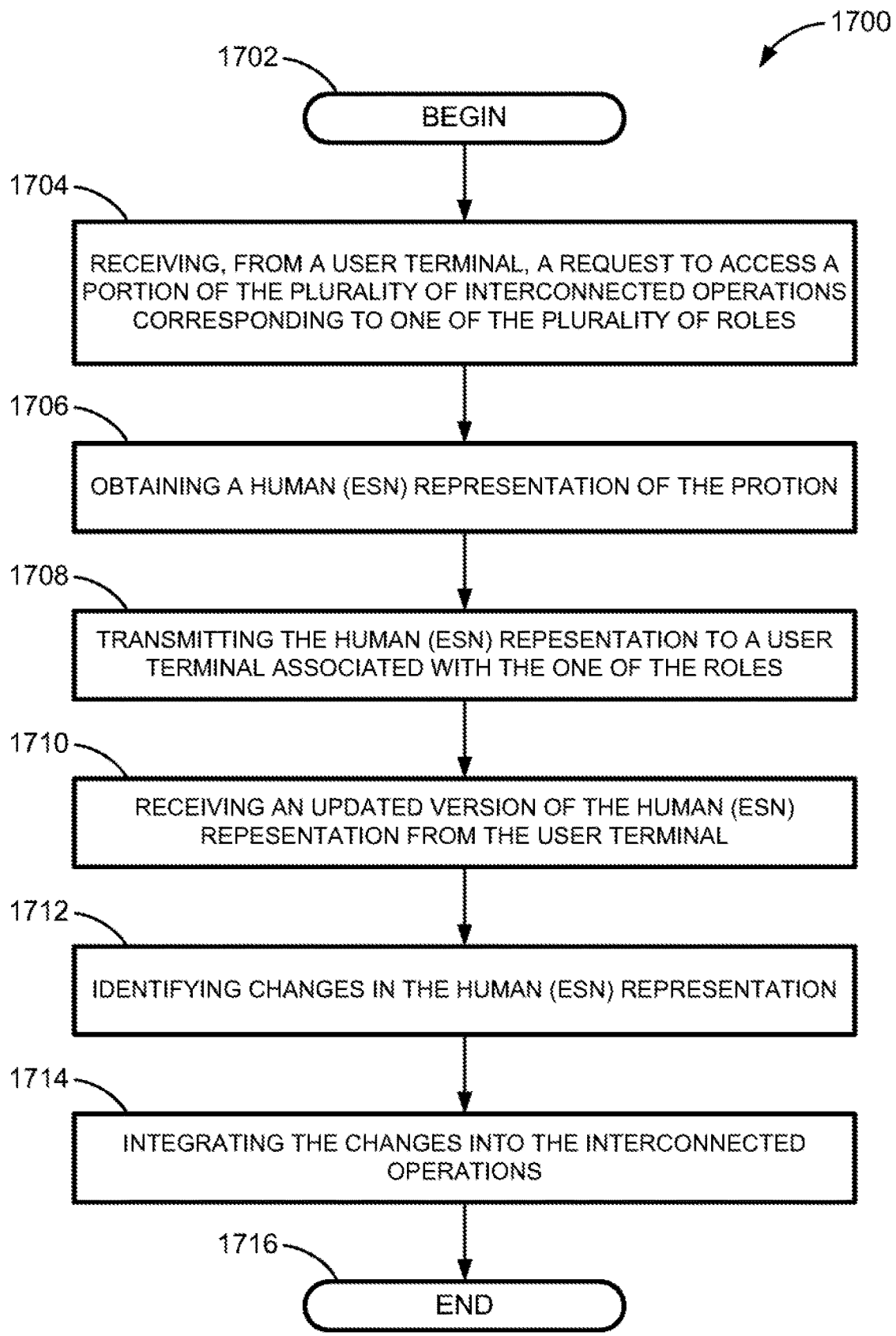
FIG. 17 shows an exemplary method according to the various embodiments.

Now turning to FIG. 17, there is shown a general methodology 1700 for management of complex operations in accordance with an embodiment. In particular, a method of management of a system that manages data files using a plurality of interconnected operations associated with a plurality of roles. As noted above, the data files can files suspect of having malware, health records, or can represent anything else. As such, the data files can also be simply pointer files or a series of hyperlinks.

The methodology begins at step 1702 and continues at step 1704. At step 1704, a request is received from a user terminal to access a portion of the plurality of interconnected operations for one of the plurality of roles. For example, as shown in FIG. 16, a patient can request access to his treatment plan via a patient portal. In response to the request, the system can, at step 1704, obtain a human representation of the portion. For example, an ESN representation of the process can be generated for delivery to the user. As noted above, a hub system may already have such a ESN representation ready. In other configurations, the ESN representation can be generated on demand by the hub system by modeling the operations and processes associated with the treatment plan as affinity groups and conditional situations, as discussed above. Finally at step 1708, the system can transmit the human representation to the user terminal for the user to review. For example, the system can deliver an image consisting of a spatial arrangement of one or more affinity groups blocks interconnected via one or more conditional situation blocks.

In some implementations, the user terminal can be used to alter or update the treatment plan or any aspects thereof. For example, a user, such as a physician, may define additional affinity groups or provide additional conditional situations for moving patients from one affinity group to the other. Alternatively or in combination, the physician may adjust parameters associated with affinity groups or conditional situations. Regardless of the changes done at the user terminal, these result in an updated version of the human representation being delivered back to the system at step 1710.

In response to receiving the updated version at step 1710, the system can, at step 1712, identify changes in the human representation. This can be done via a comparison of the incoming and outgoing representations. However, in the various embodiments any other means of detecting changes can be used. Thereafter, at step 1714, the changes can be integrated into the plurality of interconnected operations. In some embodiments, this can involve using the identification at 1712 to determine what changes should be made in the underlying computer programs running the operations in the system and applying the changes as needed. In other embodiments, the identification at step 1712 can be used to trigger a recompilation at step 1714. That is, the human representation can be used as a programming language that the system can use to compile programs for any process that need to be updated. Ins such embodiments, this provide the advantage in that users need not learn complex computer languages to implement processes, but rather simply define new affinity groups and conditional situations are needed. The method can then end at step 1716.

In some embodiments, the integrating at step 1714 can also involve determining other ones of the plurality of roles associated with the interconnected operations and transmitting an update notification to one or more user terminals associated with the other ones of the plurality of roles. In this way, if a change is made by one role, this affords other roles the opportunity to make any adjustments needed as soon as possible. For example, after detecting changes made by a physician, a payer may need to adjust their operations to account for any new affinity groups or conditional situations needed.

In some embodiments the obtaining at step 1706 can involve identifying computer-executable code in the system associated with the portion and converting the computer-executable code to the human representation. That is, converting the computer-executable code associated with role into a collection of affinity groups interconnected by conditional situations. The human representation may be less compact than the computer-executable, the spatial arrangement of interconnected affinity groups and conditional situations will be easier and more intuitive for a human to comprehend, especially a user with little or no computer programming experience. Such a conversion can involve breaking down computer-executable code into its simplest elements and then converting the code to an equivalent a collection of affinity groups interconnected by conditional situations. Filtering can be used in cases where the computer-executable code cannot be separated or segregated by role. That is, after a human representation is generated, any affinity groups or conditional situations not related to the role can be filtered out prior to providing the human representation to the user.

In other embodiments, such a human representation may be readily available. For example, all operations at the system may be indexed or stored in an ESN representation. In such a configuration, the obtaining can involve filtering out any affinity groups and conditional situations not associated with the role. The remaining portions of the overall ESN representation can then be provided.

If filtering is used, then such filtering may need to be considered when integrating changes, as discussed at step 1714. That is, some or all affinity groups and conditional situations not associated with the role may need to be restored to the human representation prior to integrating the changes.

As noted above, the system can be configured as a plurality of networked computing devices, where each of the plurality of networked computing devices associated with at least one of the plurality of roles. In such a configuration, the system can include at least one hub system interconnecting the plurality of networked computing devices. Further, such a hub system can be used to carry out any of the steps described with respect to FIG. 17. As such, the hub system can be used for monitoring and coordinating the plurality of interconnected operations at the plurality of networked computing devices. Such coordinating and monitoring can be done directly. Alternatively, the hub system can generate and monitor a model system that represents the plurality of interconnected operations as a collection of affinity group blocks interconnected by one or more conditional situation blocks.

It should be noted that although FIGS. 16 and 17 have been discussed primary with respect to healthcare management, the same methodology applies to management of any other system. For example, the steps enumerated above can be used to manage processing of files suspected of containing malware or other malicious code.

Figure 18A:
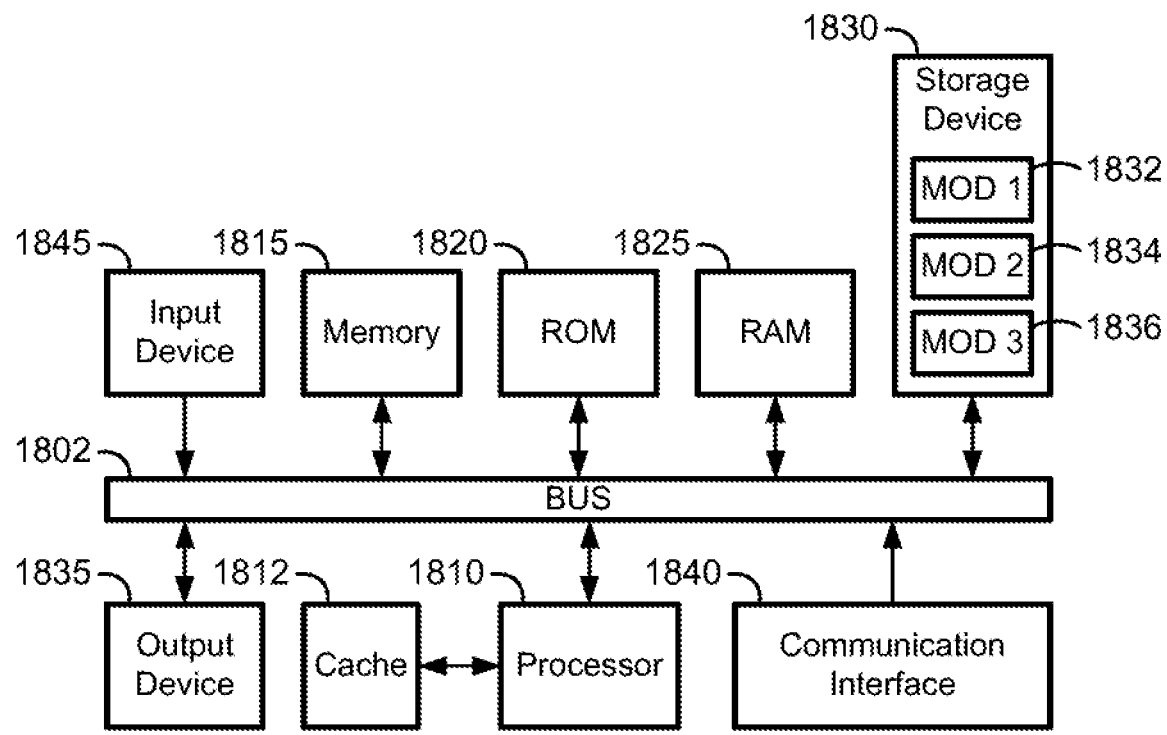
FIGS. 18A and 18B show exemplary system embodiments for implementing the various embodiments.
Figure 18B:
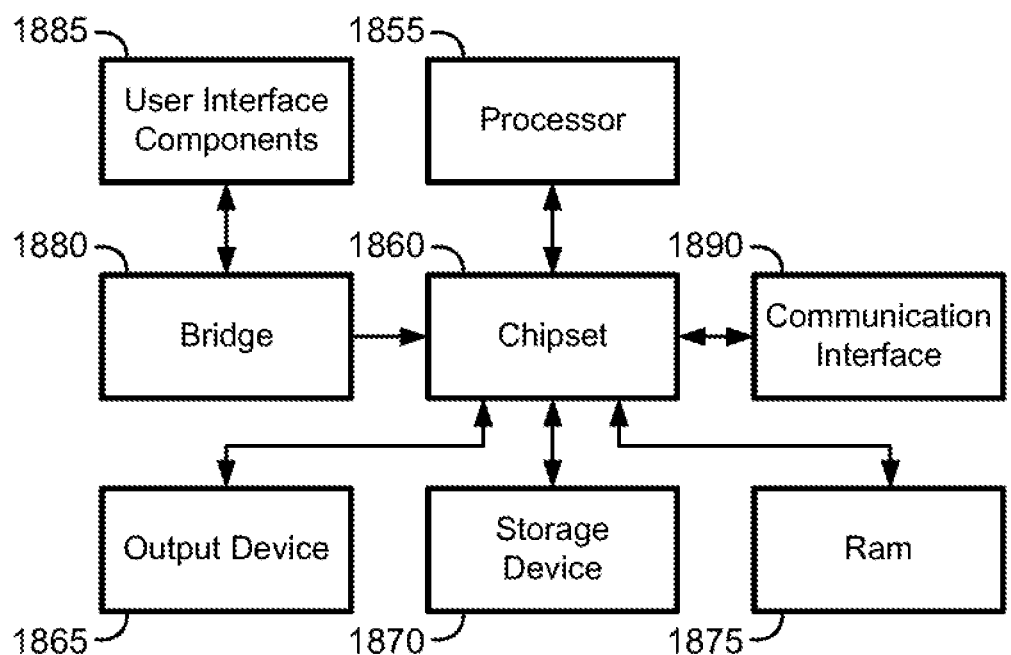

FIGS. 18A and 18B illustrate exemplary possible system configurations. The more appropriate configuration will be apparent to those of ordinary skill in the art when practicing the present technology. Persons of ordinary skill in the art will also readily appreciate that other system configurations are possible.

FIG. 18A illustrates a conventional system bus computing system architecture 1800 wherein the components of the system are in electrical communication with each other using a bus 1805. Exemplary system 1800 includes a processing unit (CPU or processor) 1810 and a system bus 1805 that couples various system components including the system memory 1815, such as read only memory (ROM) 1820 and random access memory (RAM) 1825, to the processor 1810. The system 1800 can include a cache of high-speed memory connected directly with, in close proximity to, or integrated as part of the processor 1810. The system 1800 can copy data from the memory 1815 and/or the storage device 1830 to the cache 1812 for quick access by the processor 1810. In this way, the cache can provide a performance boost that avoids processor 1810 delays while waiting for data. These and other modules can control or be configured to control the processor 1810 to perform various actions. Other system memory 1815 may be available for use as well. The memory 1815 can include multiple different types of memory with different performance characteristics. The processor 1810 can include any general purpose processor and a hardware module or software module, such as module 1 1832, module 2 1834, and module 3 1836 stored in storage device 1830, configured to control the processor 1810 as well as a special-purpose processor where software instructions are incorporated into the actual processor design. The processor 1810 may essentially be a completely self-contained computing system, containing multiple cores or processors, a bus, memory controller, cache, etc. A multi-core processor may be symmetric or asymmetric.

To enable user interaction with the computing device 1800, an input device 1845 can represent any number of input mechanisms, such as a microphone for speech, a touch-sensitive screen for gesture or graphical input, keyboard, mouse, motion input, speech and so forth. An output device 1835 can also be one or more of a number of output mechanisms known to those of skill in the art. In some instances, multimodal systems can enable a user to provide multiple types of input to communicate with the computing device 1800. The communications interface 1840 can generally govern and manage the user input and system output. There is no restriction on operating on any particular hardware arrangement and therefore the basic features here may easily be substituted for improved hardware or firmware arrangements as they are developed.

Storage device 1830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1825, read only memory (ROM) 1820, and hybrids thereof.

The storage device 1830 can include software modules 1832, 1834, 1836 for controlling the processor 1810. Other hardware or software modules are contemplated. The storage device 1830 can be connected to the system bus 1805. In one aspect, a hardware module that performs a particular function can include the software component stored in a computer-readable medium in connection with the necessary hardware components, such as the processor 1810, bus 1805, display 1835, and so forth, to carry out the function.

FIG. 18B illustrates a computer system 1850 having a chipset architecture that can be used in executing the described method and generating and displaying a graphical user interface (GUI). Computer system 1850 is an example of computer hardware, software, and firmware that can be used to implement the disclosed technology. System 1850 can include a processor 1855, representative of any number of physically and/or logically distinct resources capable of executing software, firmware, and hardware configured to perform identified computations. Processor 1855 can communicate with a chipset 1860 that can control input to and output from processor 1855. In this example, chipset 1860 outputs information to output 1865, such as a display, and can read and write information to storage device 1870, which can include magnetic media, and solid state media, for example. Chipset 1860 can also read data from and write data to RAM 1875. A bridge 1880 for interfacing with a variety of user interface components 1885 can be provided for interfacing with chipset 1860. Such user interface components 1885 can include a keyboard, a microphone, touch detection and processing circuitry, a pointing device, such as a mouse, and so on. In general, inputs to system 1850 can come from any of a variety of sources, machine generated and/or human generated.

Chipset 1860 can also interface with one or more communication interfaces 1890 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1855 analyzing data stored in storage 1870 or 1875. Further, the machine can receive inputs from a user via user interface components 1885 and execute appropriate functions, such as browsing functions by interpreting these inputs using processor 1855.

It can be appreciated that exemplary systems 1800 and 1850 can have more than one processor 1810 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some configurations the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language reciting "at least one of" a set indicates that one member of the set or multiple members of the set satisfy the claim. Tangible computer-readable storage media, computer-readable storage devices, or computer-readable memory devices, expressly exclude media such as transitory waves, energy, carrier signals, electromagnetic waves, and signals per se.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A method of management of a system for managing data files using a plurality of interconnected operations associated with a plurality of roles that is determined using a signature analysis and a behavior analysis, the method comprising:
   receiving, from a user terminal of the system, a request to access a portion of the plurality of interconnected operations, the system including a plurality of networked computing devices such that each of the plurality of networked computing devices is associated with at least one of the plurality of roles;
   obtaining a human representation of the portion, the human representation including an episodic social network representation generated by modeling the portion of the plurality of interconnected operations; and
   transmitting the human representation to the user terminal for display thereon,
   wherein the human representation comprises a spatial arrangement of two or more affinity group blocks interconnected via one or more conditional situation blocks, wherein each of the two or more affinity group blocks represents a non-exclusive data file classification associated with a set of temporal and non-temporal characteristics, and wherein each of the one or more conditional situation blocks defines a set of conditions for transferring the data files from one of the two or more affinity group blocks to another of the two or more affinity group blocks.

2. The method of claim 1, further comprising:
   receiving, from the user terminal, an updated version of the human representation;
   identifying changes in the human representation; and
   integrating the changes into the plurality of interconnected operations.

3. The method of claim 2, wherein the integrating comprises:
   determining other ones of the plurality of roles associated with the plurality of interconnected operations; and
   transmitting an update notification to one or more user terminals associated with the other ones of the plurality of roles.

4. The method of claim 1, wherein the obtaining comprises:
   identifying computer-executable code in the system associated with the portion; and
   converting the computer-executable code to the human representation.

5. The method of claim 1, wherein the system further comprises at least one hub system interconnecting the plurality of networked computing devices, the at least one hub system being configured to monitor and coordinate the plurality of interconnected operations at the plurality of networked computing devices.

6. The method of claim 5, wherein the receiving, the obtaining, and the transmitting are performed via operations of the at least one hub system.

7. The method of claim 5, wherein the at least one hub system monitors and coordinates the plurality of networked computing devices via a model representing the plurality of interconnected operations as a collection of affinity group blocks interconnected by at least one of the one or more conditional situation blocks.

8. The method of claim 5, wherein the at least one hub system is further configured to model the portion of the plurality of interconnected operations to generate the episodic social network representation.

9. The method of claim 1, wherein the plurality of interconnected operations includes operations for checking a data file for malicious software.

10. The method of claim 1, wherein the plurality of interconnected operations is associated with standard procedures for one or more medical conditions, and wherein at least one of the plurality of roles is associated with the one or more medical conditions.

11. The method of claim 1, further comprising filtering out any affinity group blocks and/or conditional situation blocks not associated with the one of the plurality of roles.

12. The method of claim 1, wherein the behavior analysis is run after the signature analysis in a sandbox environment.

13. A system for managing data files using a plurality of interconnected operations associated with a plurality of roles that is determined using a signature analysis and a behavior analysis, the system comprising:
   a processor;
   a plurality of networked computing devices communicatively coupled to the processor, each of the plurality of networked computing devices being associated with at least one of the plurality of roles; and
   a computer-readable medium having stored thereon a computer program with instructions for causing the processor to carry out operations comprising:
      receiving, from a user terminal of the system, a request to access a portion of the plurality of interconnected operations;
      obtaining a human representation of the portion, the human representation including an episodic social network representation generated by modeling the portion of the plurality of interconnected operations; and
      transmitting the human representation to the user terminal for display thereon,
      wherein the human representation comprises a spatial arrangement of two or more affinity group blocks interconnected via one or more conditional situation blocks, wherein each of the two or more affinity group blocks represents a non-exclusive data file classification associated with a set of temporal and non-temporal characteristics, and wherein each of the one or more conditional situation blocks defines a set of conditions for transferring the data files from one of the two or more affinity group blocks to another of the two or more affinity group blocks.

14. The system of claim 13, the operations further comprising:
   receiving, from the user terminal, an updated version of the human representation;
   identifying changes in the human representation; and
   integrating the changes into the plurality of interconnected operations.

15. The system of claim 14, wherein the integrating comprises:
  determining other ones of the plurality of roles associated with the plurality of interconnected operations; and
  transmitting an update notification to one or more user terminals associated with the other ones of the plurality of roles.

16. The system of claim 13, wherein the obtaining comprises:
  identifying computer-executable code in the system associated with the portion; and
  converting the computer-executable code to the human representation.

17. The system of claim 13, wherein the operations further comprising monitoring and coordinating, via at least one hub system, the plurality of interconnected operations at the plurality of networked computing devices.

18. The system of claim 17, the operations further comprising storing a model representing the plurality of interconnected operations as a collection of affinity group blocks interconnected by at least one of the one or more conditional situation blocks, wherein the at least one hub system is configured to monitor and coordinate the plurality of interconnected operations using the stored model.

19. A method of management of a system for managing data files using a plurality of interconnected operations associated with a plurality of roles that is determined using a signature analysis and a behavior analysis, the method comprising:
  receiving, from a user terminal of the system, a request to access a portion of the plurality of interconnected operations corresponding to one of a first set of validation operations in a pre-operating system (PreOS) environment and a second set of validation operations in an operating system (OS) environment, the system including a plurality of networked computing devices such that each of the plurality of networked computing devices is associated with at least one of the plurality of roles, the PreOS environment and the OS environment being associated with a portion of the plurality of roles corresponding to the portion of the plurality of interconnected operations;
  obtaining a human representation of the portion of the plurality of interconnected operations, the human representation including an episodic social network representation generated by modeling the portion of the plurality of interconnected operations; and
  transmitting the human representation to the user terminal for display thereon,
  wherein the human representation comprises a spatial arrangement of two or more affinity group blocks interconnected via one or more conditional situation blocks, wherein each of the two or more affinity group blocks represents a non-exclusive data file classification associated with a set of temporal and non-temporal characteristics, and wherein each of the one or more conditional situation blocks defines a set of conditions for transferring the data files from one of the two or more affinity group blocks to another of the two or more affinity group blocks.

20. The method of claim 19, wherein the first set of validation operations includes the signature analysis, and wherein the second set of validation operations includes the behavior analysis.

* * * * *